US006926177B1

(12) United States Patent
Scott et al.

(10) Patent No.: US 6,926,177 B1
(45) Date of Patent: Aug. 9, 2005

(54) DEVICE FOR DISPENSING SUBSTANCE FROM A CARTRIDGE

(76) Inventors: William M. Scott, 102A Holtham Road, Hampstead, Quebec (CA) H3X 3N4; Christopher Weldon, 1225 Grand Rang, Ste Clotilde, QC (CA) J0L 1W0

( * ) Notice: Subject to any disclaimer, the term of this patent is extended or adjusted under 35 U.S.C. 154(b) by 0 days.

(21) Appl. No.: 09/539,874

(22) Filed: Mar. 31, 2000

(51) Int. Cl.[7] ........................... B67D 5/42; G01F 11/00
(52) U.S. Cl. ....................... 222/390; 222/326; 222/333
(58) Field of Search ................................ 222/326, 333, 222/390, 63, 174, 309, 327, 370, 386, 391

(56) References Cited

U.S. PATENT DOCUMENTS

| | | | | |
|---|---|---|---|---|
| 2,748,991 A | * | 6/1956 | McCarthy | 222/390 X |
| 3,208,638 A | | 9/1965 | Frenzel et al. | |
| 3,254,806 A | | 6/1966 | Madsen | |
| 3,635,378 A | | 1/1972 | DeHart | |
| 3,854,629 A | | 12/1974 | Blieberger | |
| 3,913,799 A | | 10/1975 | Davis, Jr. | |
| 3,987,939 A | | 10/1976 | Pedone, Jr. et al. | |
| 4,024,994 A | | 5/1977 | Davis, Jr. | |
| 4,249,677 A | | 2/1981 | Davis, Jr. | |
| 4,258,866 A | | 3/1981 | Bergman | |
| 4,260,076 A | | 4/1981 | Bergman | |
| 4,306,671 A | | 12/1981 | Fisher | |
| 4,335,834 A | | 6/1982 | Zepkin | |
| 4,421,251 A | * | 12/1983 | Namdari et al. | 222/333 X |
| 4,583,934 A | * | 4/1986 | Hata et al. | 222/333 X |
| 4,653,675 A | * | 3/1987 | Ratzky | 222/333 X |
| 4,749,109 A | | 6/1988 | Kamen | |
| 5,027,984 A | | 7/1991 | Gakhar et al. | |
| 5,482,189 A | | 1/1996 | Dentler et al. | |
| 5,529,225 A | | 6/1996 | Chang | |
| 5,556,009 A | | 9/1996 | Motzko | |
| 5,579,960 A | | 12/1996 | Scott | |
| 5,595,327 A | | 1/1997 | Dentler et al. | |
| 5,788,126 A | | 8/1998 | Chang | |
| 5,981,909 A | | 11/1999 | Freeman | |
| 6,041,976 A | | 3/2000 | Robertson | |

FOREIGN PATENT DOCUMENTS

| | | | | |
|---|---|---|---|---|
| EP | 537550 A1 | * | 4/1993 | 222/389 |
| EP | 0 711 535 A1 | | 5/1996 | |

* cited by examiner

*Primary Examiner*—Tuan Nguyen
(74) *Attorney, Agent, or Firm*—Hoffman, Wasson & Gitler, P.C.

(57) ABSTRACT

There is described an improved device for dispensing substance from a cartridge. The device includes a retaining mechanism for retaining a substance containing cartridge. The device further includes a telescoping plunger assembly, the assembly including at least a frontmost member, a rearmost member and at least one intervening member which can be in the nature of a turnbuckle. At least a portion of the plunger assembly is connected to the base. A motor is provided for rotating the turnbuckle of the telescoping plunger assembly, and there is also a fast rewinder comprising a turnbuckle splitter whereby the turnbuckle splits longitudinally into two halves. The device additionally includes a plunger biassing mechanism whereby the telescoping plunger assembly can be manually compacted against the resistive force of two or more plunger biassing springs.

35 Claims, 15 Drawing Sheets

DEVICE FOR DISPENSING SUBSTANCE FROM A CARTRIDGE

BACKGROUND OF THE INVENTION

A. The Field of Invention

The present invention relates to a device for dispensing substance from a cartridge and more particularly to a compact motorized device for dispensing substance from a cartridge with a quick rewind feature.

B. A Description of the Prior Art

Mechanical caulking guns are well known in the field for use in dispensing material from a cartridge. These substance containing cartridges are well known in the construction industry and are generally cylindrical in shape, with a plastic delivery cone attached to one end of the cylinder and a flat, metal, disc-shaped base seal at the other. The disc-shaped base seal is of the same diameter as the cylinder so it may freely slide within the cylinder. When the plastic delivery cone is sliced open at its tip, the front seal behind the delivery cone is pierced, and the disc-shaped base seal is pushed within the cylinder towards the delivery cone, the substance within the cylinder is emitted from the delivery cone.

Currently these cartridges are used with mechanical devices, known as guns, which apply pressure to the disc-shaped base seal at the rear of the cartridge held within the gun. The most widely available guns consist of a holding receptacle for the cartridge, an integrated rod and plunger, and a ratchet mechanism whereby the rod and plunger are advanced though a hand operated lever. Pressure is applied to the disc-shaped base seal of the cartridge through the integrated rod and plunger which is activated in response to the pumping of a trigger on the gun. These mechanical guns can be awkward to use since, quite often, they are used to apply material to a hard to reach place. In such an instance, it is hard for the person using the gun to hold the gun steady while pumping the trigger with his index finger. With repeated use of such a mechanical device, one's hand will quickly become fatigued. The overall configuration of the mechanical gun when it is holding a cartridge is at least twice as long as the cartridge with the trigger midway along the length. The configuration of the conventional gun presents a number of ergonomic problems. Firstly, the rearward extension of the rod over the operator's hand can interfere with the operator's arm movement. Secondly, the excessive overall length of the mechanical gun presents positional problems in confined work spaces. Thirdly, the hand power required leads to arm fatigue and resulting loss of fine control over delivery of the contents of the cartridge. Lastly, at the end of the application of a bead of substance from the cartridge, bead overflow occurs which can only be prevented by the operator manually retracting the ratchet drive. Manual retracting of the ratchet drive makes control over the termination of substance delivery inconsistent and difficult to accomplish.

In the past, attempts have been made to design motorized substance delivery guns, however, these attempts have not cured the problem of having the rod protruding from the back of the loaded gun. In fact, many attempts at motorized devices for dispensing substance from a cartridge have created new problems relating chiefly to the added weight of the motorized unit, but also resulting from the cumbersome method by which the motorized mechanism had to be rewound once substance was delivered from the cone.

OBJECTIVES OF THE INVENTION

The primary objective of this invention is to address the ergonomic drawbacks of motorized and mechanical guns presently on the market and previously discussed by utilizing a telescoping plunger assembly which is able to expand in a linear direction from a compacted state to dispense material from a cartridge. A second objective is to provide a motorized drive mechanism with an automatic reversing mechanism to minimize overflow of substance when an operator stops the motorized mechanism through both a mechanical means when the motorized mechanism is an external motor and through a reversal of the motor itself when the motorized mechanism is an internal motor. A third objective is to provide a fast rewind mechanism to rapidly and automatically reset the plunger mechanism when a new cartridge is inserted into the invention. A fourth objective is to take advantage of lightweight materials to achieve a lightweight product which may be produced economically. A fifth objective is to provide accessories for operator convenience such as a delivery cone tip cutter, cartridge front seal piercing rod, bead application guides, and nipples which attach to the delivery cone which act as guides in shaping the bead as it flows out of the delivery cone.

SUMMARY OF THE INVENTION

According to the present invention, there is provided, a device for dispensing substance from a cartridge comprising: a retaining means for retaining a substance containing cartridge; a telescoping plunger assembly made up of a plurality of interconnecting members; a drive train means for driving said telescoping plunger assembly; and, a base to which at least one of the interconnecting members is fixed.

In its contracted state, the plurality of interconnecting members rest one within each other. Once the drive train means is actuated, the interconnecting members telescope along the longitudinal axis of the telescoping plunger assembly in a direction away from the point to which at least one of the interconnecting members is fixed to the base, thereby expanding the length of the telescoping plunger assembly. As the telescoping plunger assembly expands, the plunger head at the terminus of telescoping plunger assembly comes in contact with the base seal at the rear end of a cartridge that is held within the device by the retaining means, forcing substance to be emitted from the cartridge.

There are several methods by which drive train means can drive telescoping plunger assembly. Drive train means can force hydraulic fluid into the interconnecting members of telescoping plunger assembly, thereby causing the assembly to expand. While this method of driving telescoping plunger assembly works, the weight of the hydraulic fluid and the pumps necessary to inject and withdraw the fluid from the telescoping plunger assembly mean that this is not the best method of driving telescoping plunger assembly.

A better method involves a telescoping plunger assembly consisting of a plurality of threaded, at least partially hollowed out, members, each of which can be withdrawn into or upon an adjacent member when one of said members is rotated by the drive train means. In order for this better method for driving telescoping plunger assembly to work, however, the member (or members—for ease of description, the singular will be used, bearing in mind that there can be a plurality of non-rotating members) that is not driven by the drive train means must be fixed to the base so it does not rotate, but is still allowed to move along the length of telescoping plunger assembly as the threads on the rotating member interact with the threads on the non-rotating member. In this better method, the non-rotating member is fixed to the base by at least one stabilization rod that runs parallel to the length axis of the telescoping plunger assembly upon which the non-rotating member is free to slide. However, the disadvantage of this better method is that a great deal of torque is placed upon at least one stabilization rod. In order to properly stabilize the non-rotating member, a plurality of stabilization rods must be used, or an extremely strong stabilization rod must be used, all of which increases the weight of the device. The disadvantage is exacerbated in the case where there is a plurality of non-rotating members, each of which has to be stabilized.

In a more preferred embodiment for the present invention, the telescoping plunger assembly again consists of a plurality of threaded, at least partially hollowed out, members each of which can be withdrawn into or upon an adjacent member when one of said members is rotated, additionally there being at least a frontmost member, a rearmost member and at least one intervening member, wherein at least one of the intervening members is a turnbuckle which is rotated by drive train means.

DESCRIPTION OF THE DRAWINGS

Preferred embodiments of the present invention will be further described with the aid of the following drawings in which.

DETAILED DESCRIPTION OF THE PREFERRED EMBODIMENT

Figure 1:
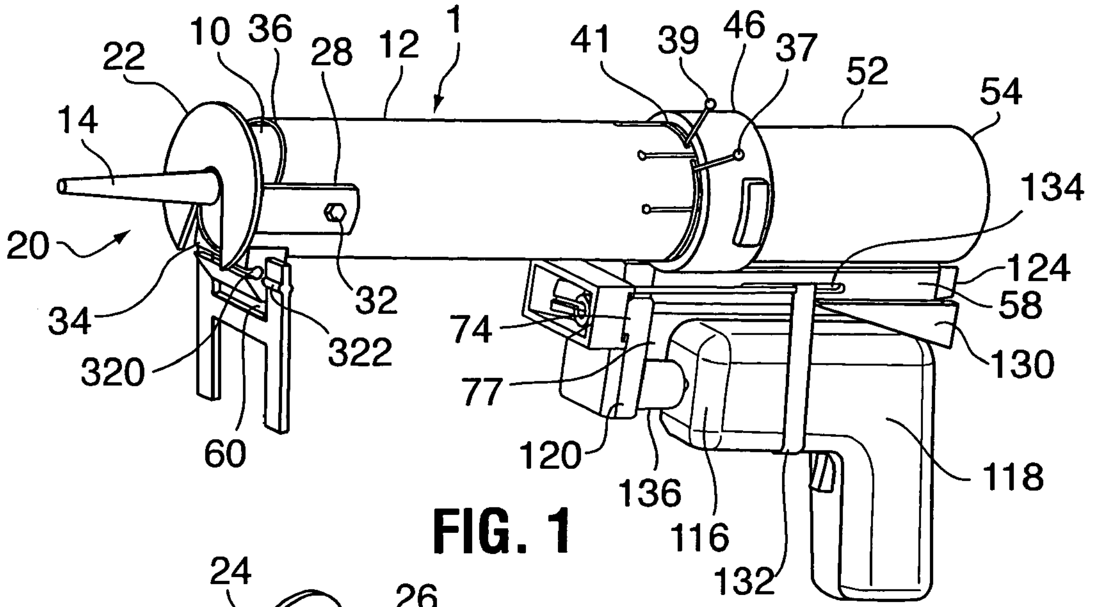
FIG. 1 is a perspective view, of the embodiment of the present device for dispensing substance from a cartridge wherein the device is powered by a reversible drill.
Figure 2:
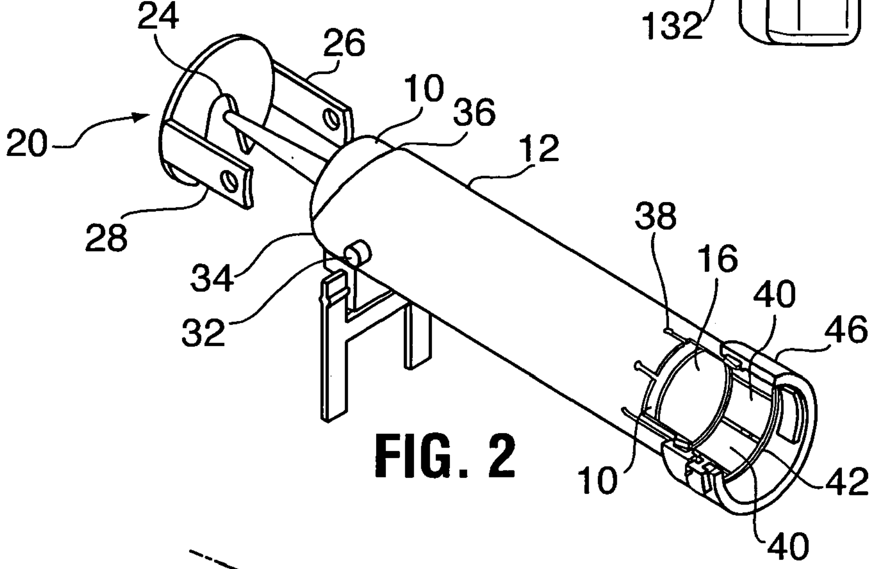
FIG. 2 is a perspective view of the retaining cap and canister which are seen towards the front of the device of FIG. 1.
Figure 3:
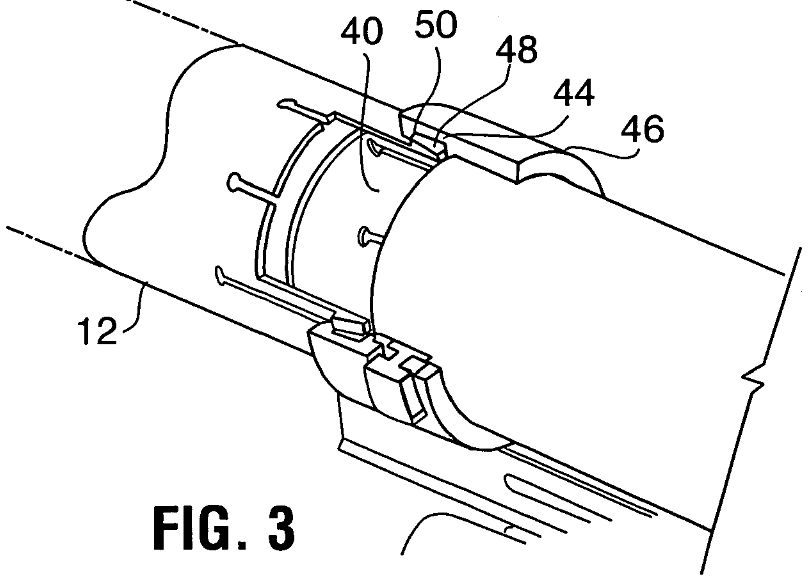
FIG. 3 is a perspective view, partially cut away, showing details of the attachment of canister to ring of the present device.

The front end of a device 1 for dispensing substance from a cartridge, which is in the nature of a caulking gun and will sometimes be referred to hereinafter as such for convenience, is dimensioned to receive a substance containing cartridge 10 through a hollow cylindrical canister 12. Cartridges such as cartridge 10 are presently available in the building supply industry for substances such as caulking, sealants, glue and lubricants. Cartridge 10 is a standard stock item with a delivery cone 14 protruding from one end and a base seal 16 at its other end. The diameter of base seal 16 matches that of the interior of cartridge 10. When force is applied to the centre of base seal 16, it will slide along the interior of cartridge 10, causing the contents of cartridge 10 to be expelled from delivery cone 14.

Figure 4:
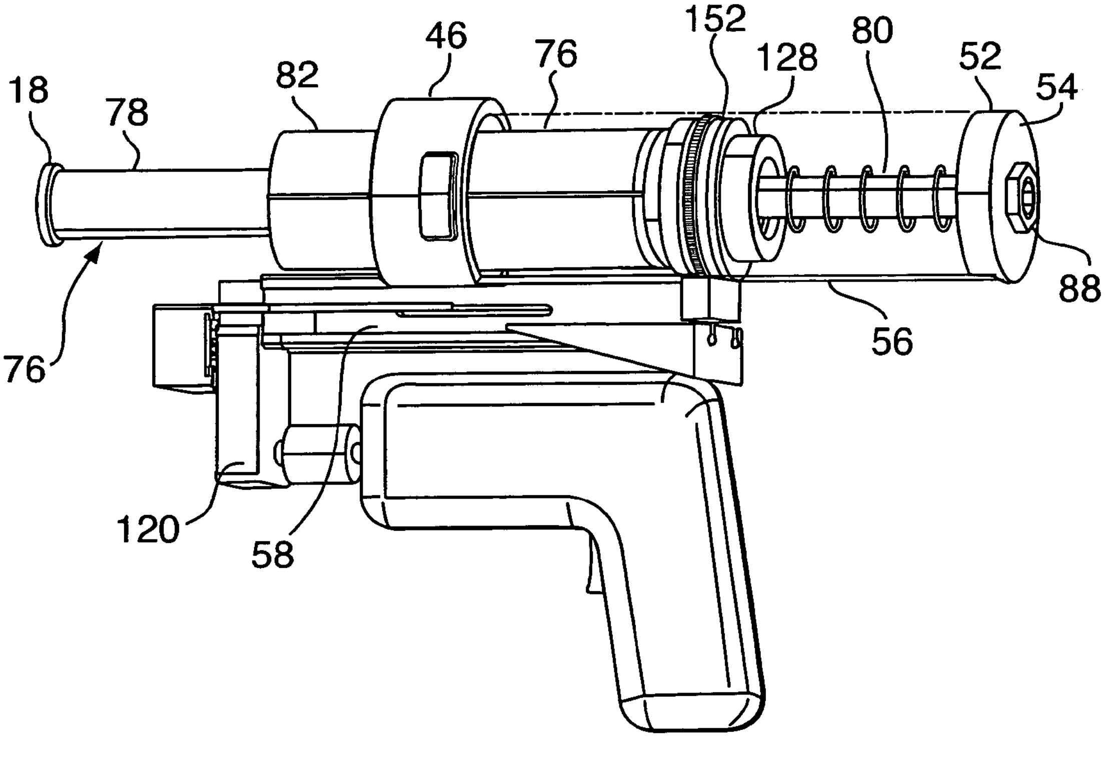
FIG. 4 is a perspective view, partially in phantom, of the present device showing the front rod, rear rod, turnbuckle, hub, fixation nut and (partially in phantom) the transmission housing with slot.

Force is applied to base seal 16 through plunger head 18, which can be seen in FIG. 4. Cartridge 10 is held in gun 1 by retaining means generally identified by reference numeral 20. Cartridge 10, once it is placed in the front end of canister 12, is retained in canister 12 at its front end by retaining means 20 including retaining cap 22. The cap 22 is disk shaped with a groove 24 cut in to it so it can be positioned over delivery cone 14. Two perpendicular tongues 26 and 28, which are curved to match the radius of cap 22 and the wall of canister 12, are attached to cap 22 on either side of groove 24. Tongues 26 and 28 attach to canister pivots 30 and 32. The tongues 26 and 28 are flexible and the space between them is equal to the outside diameter of canister 12. End 34 of canister 12 is cut at approximately forty-five degrees toward its upper region 36 such that cap 22 can be pivoted about canister pivots 30 and 32 over the upper region 36. As the radius of curvature in tongues 26 and 28 matches the radius of curve of canister 12, cap 22 will tend to snap into place when it is swung over upper region of end 36 to rest up flush against end 34.

The rear portion 38 of canister 12 is fluted with a number of flutes 40 cut along the length of the rear portion 38 of canister 12. Raised annular ring 42 is positioned to fit into annular groove 44 positioned in the interior of ring 46. This arrangement of annular ring 42 sitting in annular groove 44 allows for an axial lock of canister 12 in ring 46 while permitting relative rotation of canister 12 within ring 46. Circumferential compression of the rear portion 38 of canister 12 will disengage annular ring 42 from annular groove 44 in ring 46, allowing for the removal of canister 12 from the remainder of gun 1 and access to the workings of the gun for repair and maintenance work. Canister 12 can be reattached to the device for dispensing substance from a cartridge 1 at the front end of ring 46 by circumferentially compressing the rear portion 38 of the canister, positioning annular ring 42 adjacent to annular groove 44, and releasing compression allowing annular ring 42 to expand into annular groove 44. Compression of the rear portion of canister 12 may be facilitated by squeezing together handles 37, 39 on C-clamp 41, which is positioned over the rear end of canister 12. Flutes 40 may also be equipped with outwardly directed barbs 48, which can catch on an inward facing lip 50 on annular groove 44 should a stronger grip surface between the retaining means 20 and the transmission housing 52 (via ring 46) be necessary. Rotation of canister 12 allows an operator to position guide mount 60 while holding the remainder of gun 1 stationary.

Figure 11:
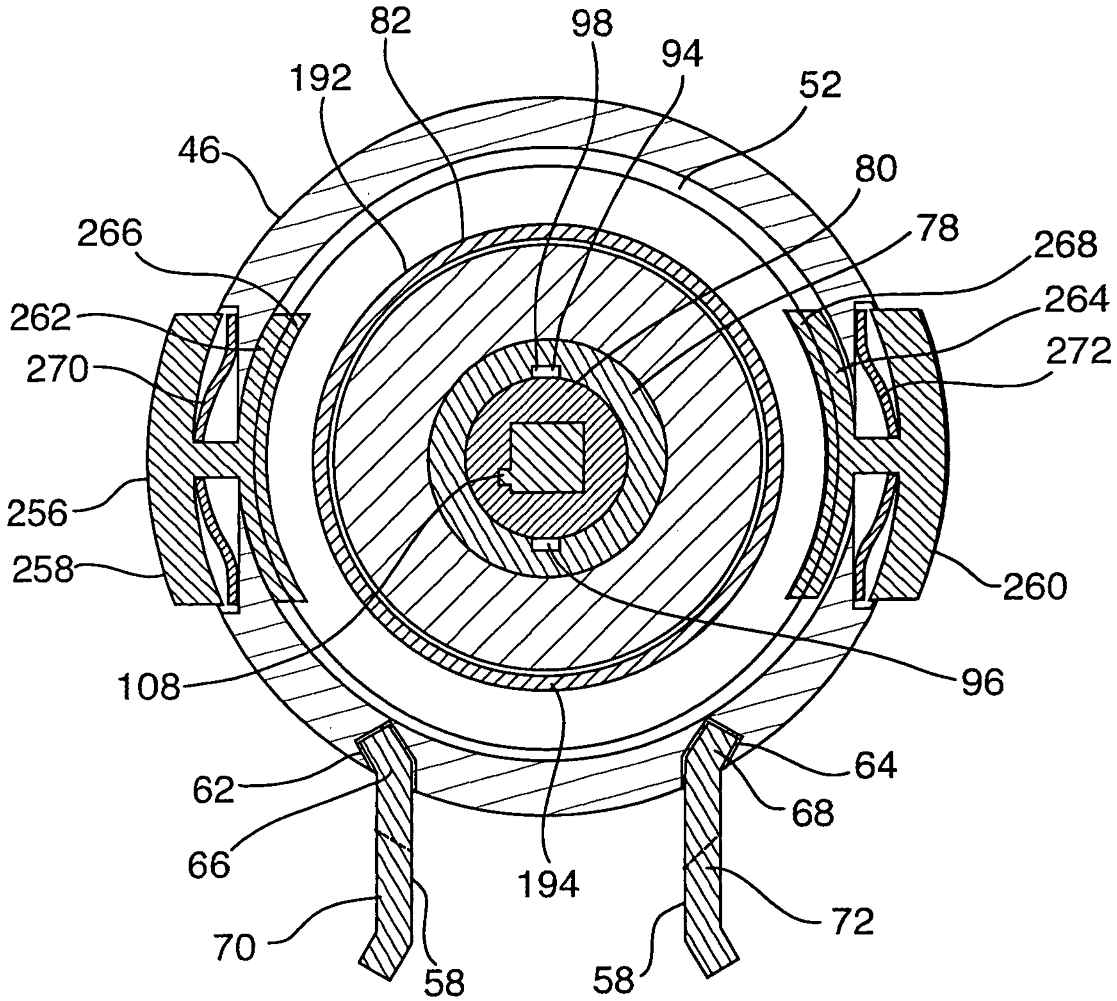
FIG. 11 is a cross-sectional, front elevational view showing the brake actuator mechanism, transmission frame, transmission housing and telescoping plunger assembly of the present device.
Figure 12:
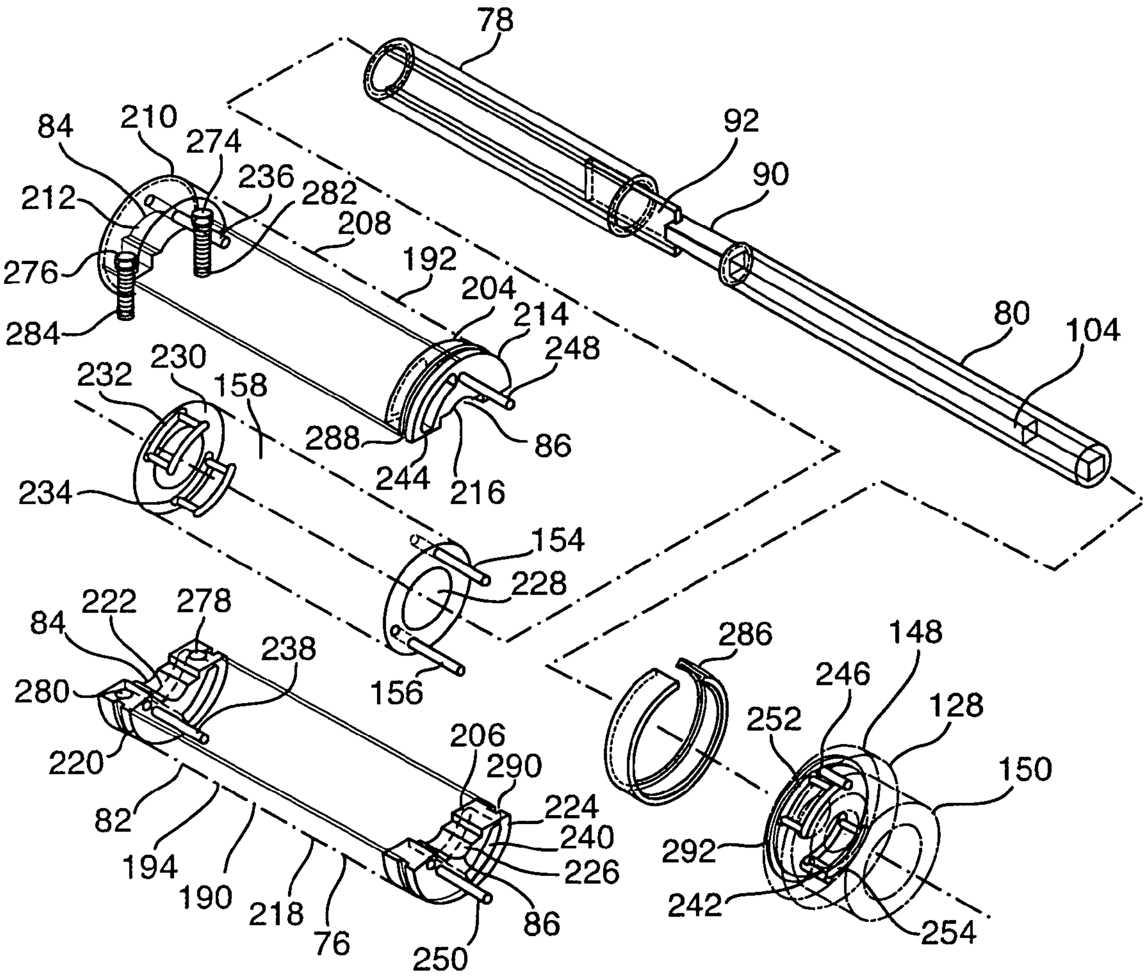
FIG. 12 is an exploded perspective view, partially in phantom, showing the telescoping plunger assembly, turnbuckle, alignment cage and drive hub of the present device.
Figure 16:
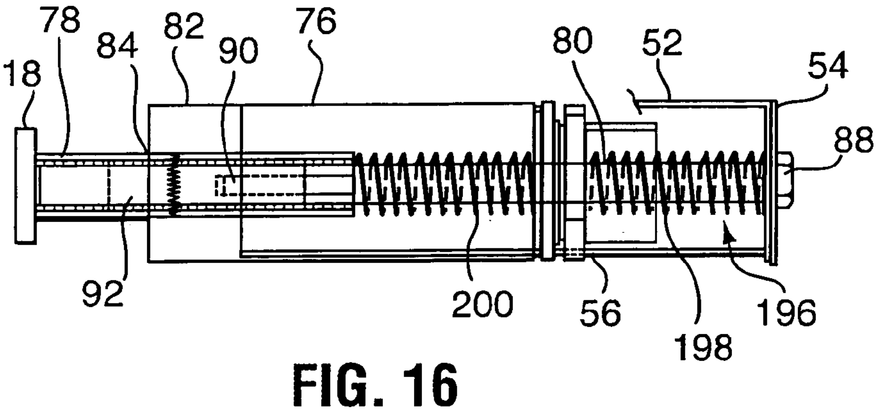
FIG. 16 is a side elevational view, partially in phantom, showing the telescoping plunger assembly, biasing spring means, the drive hub, fixation nut and the transmission housing of the present device when the telescoping plunger assembly is compacted.
Figure 17:
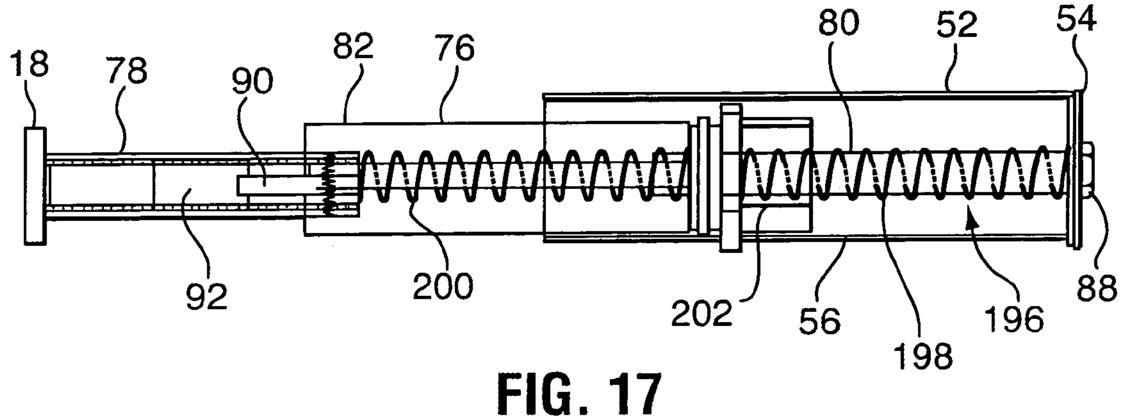
FIG. 17 is a side elevational view, partially in phantom, showing the telescoping plunger assembly, biasing spring means, the drive hub and the transmission housing of the present device when the telescoping plunger assembly is expanded.
Figure 18:
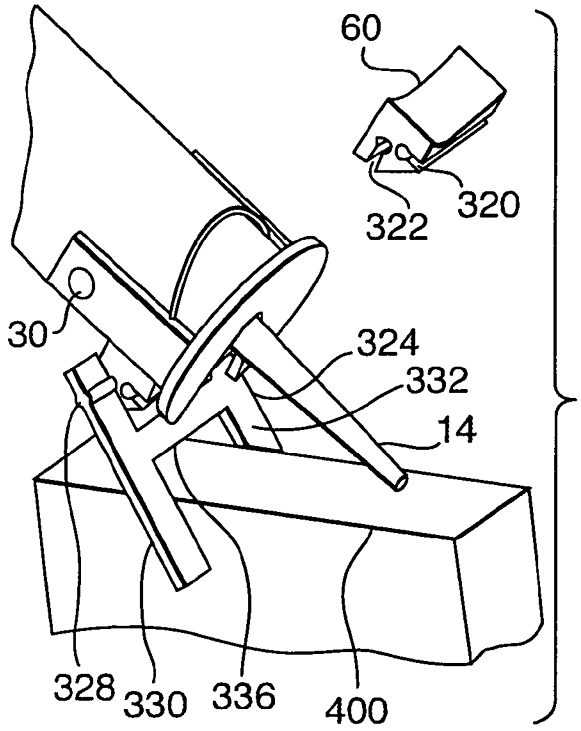
FIG. 18 is a perspective view showing a guide mount for the present device and a joist guide fitted to the guide mount.
Figure 19:
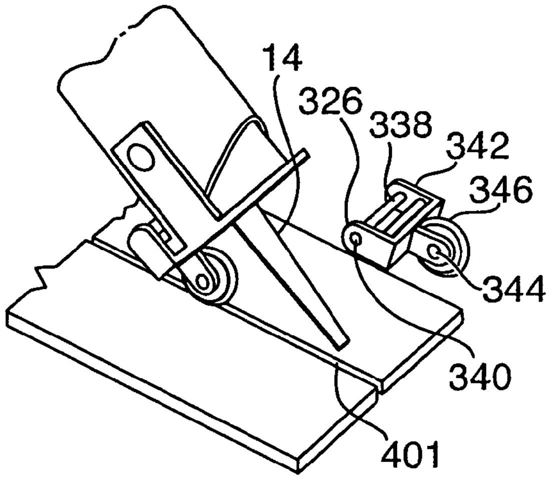
FIG. 19 is a perspective view of a seam guide, and seam guide when fitted to the guide mount shown in FIG. 18.

Ring 46 is attached at its rear end to transmission housing 52. Transmission housing 52 consists of a thin cylindrical shell, closed at its rearmost end with cap 54. Slot 56, which is seen in FIG. 4, runs along the length of the underside of transmission housing 52. Ring 46 is mounted on transmission frame 58 by way of axial grooves 62, 64 as shown in FIG. 11 which accept the flared edges 66, 68 of transmission frame members 70, 72. Ring 46, together with attached canister 12 and transmission housing 52, is therefore free to slide along the length of transmission frame 58. Transmission housing 52 is able to slide over drive assembly 74 through slot 56 seen in FIGS. 16 and 17 in the underside of transmission housing 52.

Plunger head 18 is moved forwards and backwards along the length of gun 1 via telescoping plunger assembly generally designated by reference numeral 76. Telescoping plunger assembly 76 consists of a plurality of interconnecting elements, at least one of which is able to be withdrawn into or extended from a recess in the next adjacent element. When all the elements are withdrawn into the recesses in the next adjacent element, telescoping plunger assembly 76 is fully compacted. When all the elements are extended from the recesses in the next adjacent element, telescoping plunger assembly 76 is fully extended. In the preferred embodiment, the major components of telescoping plunger assembly 76 are front rod 78, rear rod 80 and intermediate turnbuckle 82.

Plunger head 18 is connected to the forward terminal of front rod 78. Front rod 78 and rear rod 80 are externally threaded, with opposite threaded hands as shown in FIG. 21.

Figure 21:
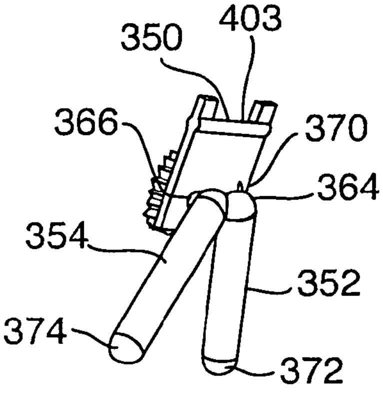
FIG. 21 is a perspective view of the reverse side of the adjustable guide for the present device shown in FIG. 20.

Front rod 78 and rear rod 80 are externally threaded with buttress threads 79, as shown in FIG. 21. The flat side 81 of buttress threads are oriented to take the load which is pushing inwards towards turnbuckle 82. This thread type and orientation prevents the threads on front rod 78 and rear rod 80 from jumping out of the corresponding threads in turnbuckle 82 under considerable linear forces such as that which is encountered when dispensing very viscous substances from a cartridge 10.

The front and rear openings 84, 86 of turnbuckle 82 are threaded to mate with the threading on front rod 78 and rear rod 80 such that when turnbuckle 82 is rotated in one direction (forward rotation), front rod 78 will be pushed out the front opening 84 of turnbuckle 82 and rear rod 80 will be pushed out the rear opening 86 of turnbuckle 82, provided that front rod 78 and rear rod 80 are not allowed to rotate relative to the device for dispensing substance from a cartridge 1 while turnbuckle 82 is rotating. The effect of rotating turnbuckle 82 in this (forward) direction has the effect of extending telescoping plunger assembly 76. Again, provided that front rod 78 and rear rod 80 are not allowed to rotate, a reversal in the direction of rotation of turnbuckle 82 will cause front rod 78 to be drawn into front opening 84 of turnbuckle 82 and rear rod to be drawn into rear opening 86 of turnbuckle 82. The effect of rotating turnbuckle 82 in this reverse direction has the effect of compacting telescoping plunger assembly 76. Extension of telescoping plunger assembly 76 within the device for dispensing substance from a cartridge 1 can be utilized to push base seal 16 into cartridge 10, which will in turn cause the contents of cartridge 10 to be expelled from delivery cone 14. When telescoping plunger assembly 76 consists of front rod 78, rear rod 80 and intermediate turnbuckle 82 as described above, telescoping plunger assembly 76 is able to be extended and compacted (that is telescope) along its long axis, while retaining strength along its cross-sectional axis as the elements of telescoping plunger assembly are being telescoped.

Figure 5:
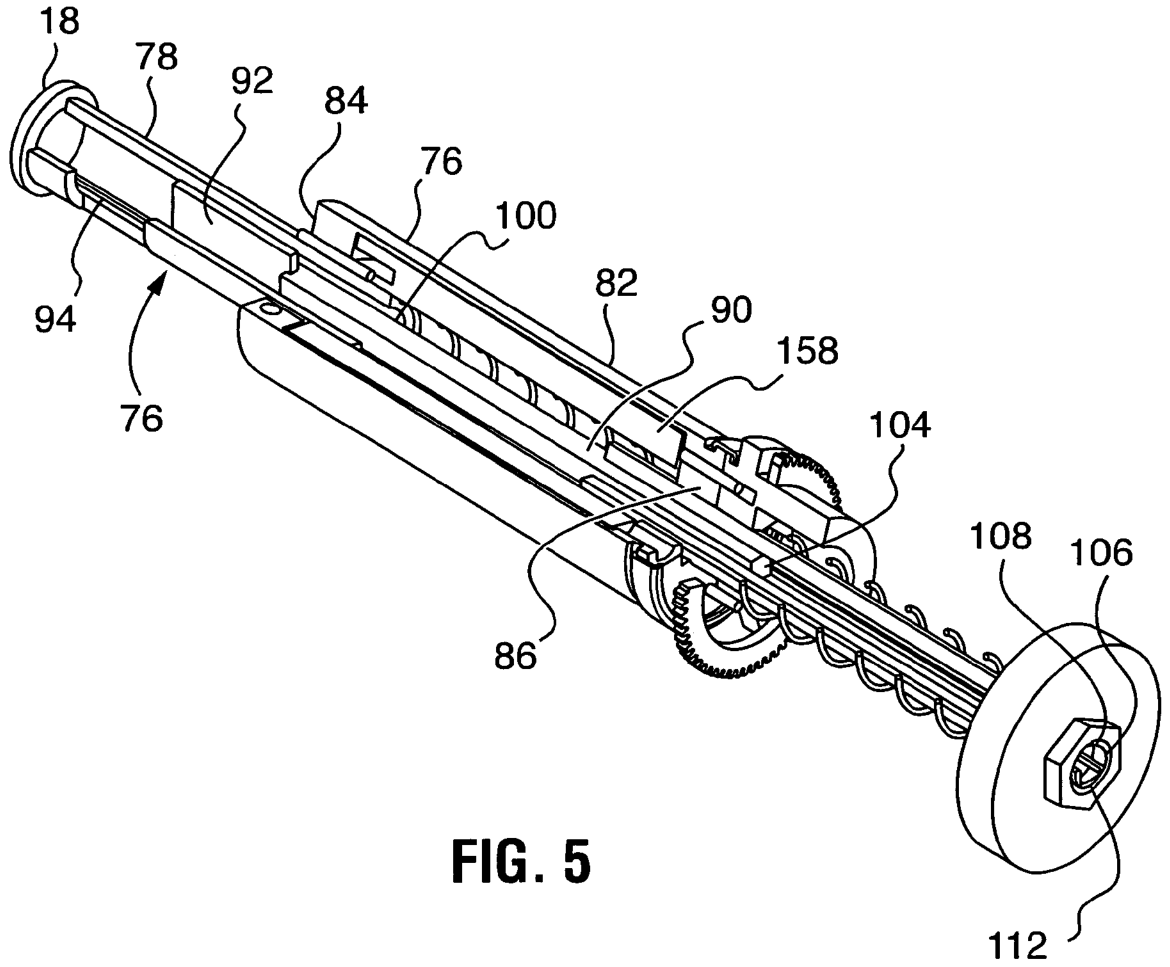
FIG. 5 is a perspective view, with a longitudinal section removed, showing the front rod, rear rod, key, alignment cage and cap of the transmission housing of the present device.
Figure 6:
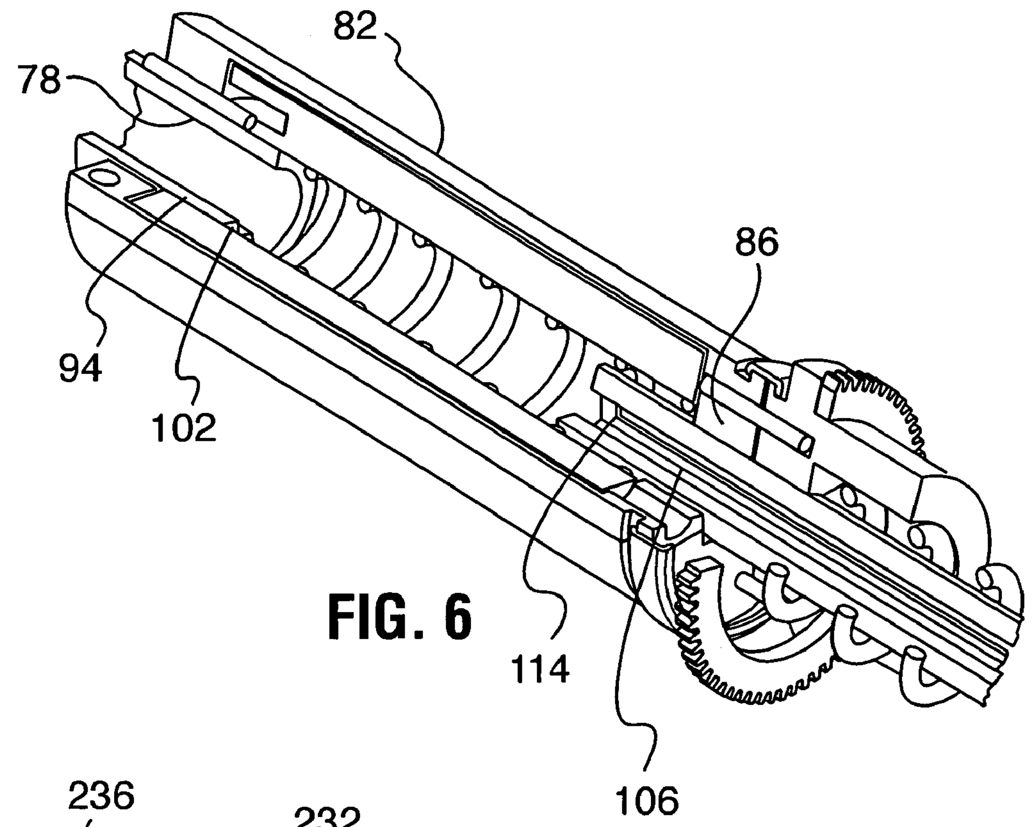
FIG. 6 is a sectioned perspective view showing detail of the turnbuckle, front and rear rods and the keyway path of the present device.
Figure 7:
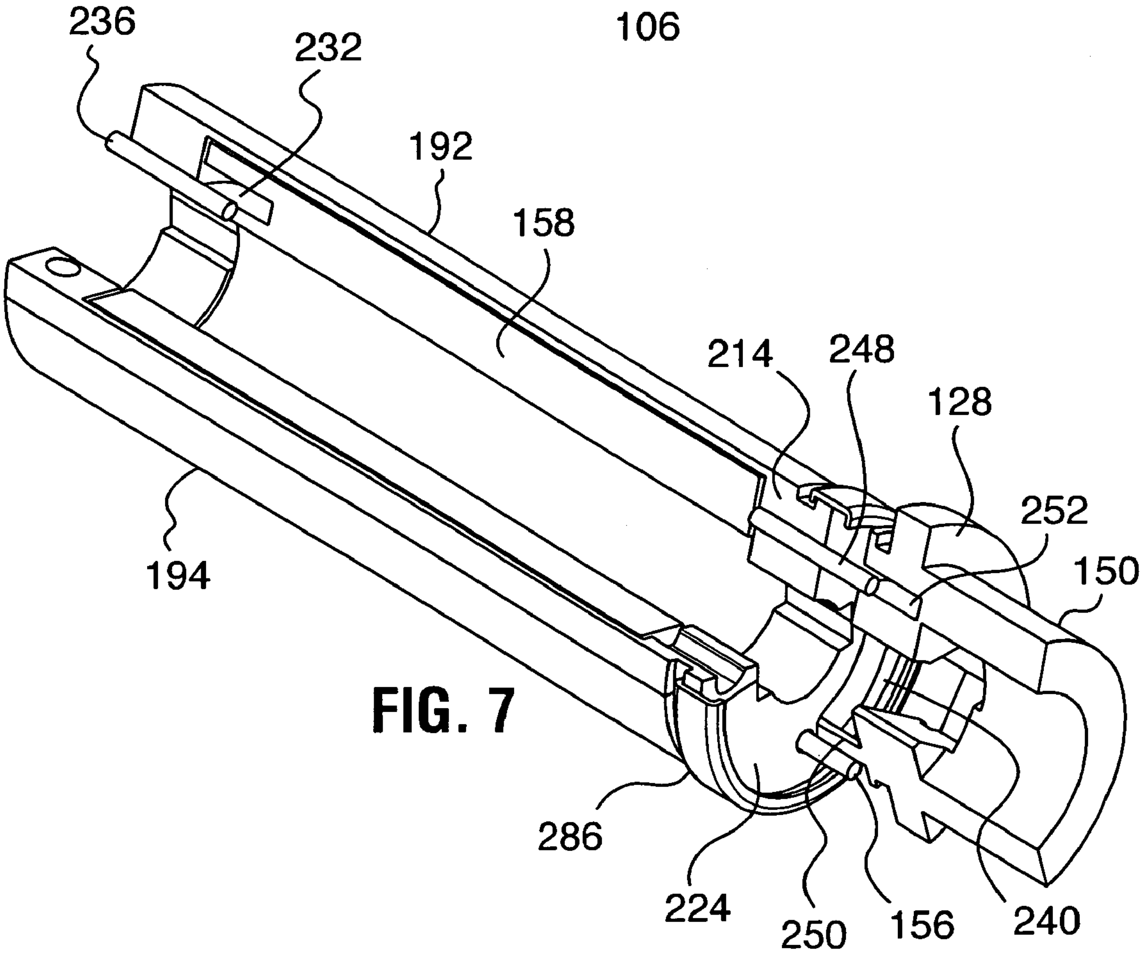
FIG. 7 is a sectioned perspective view showing detail of the upper half of the turnbuckle, with cam followers, related cam slots, alignment cage and hub drive pin of the present device.
Figure 8:
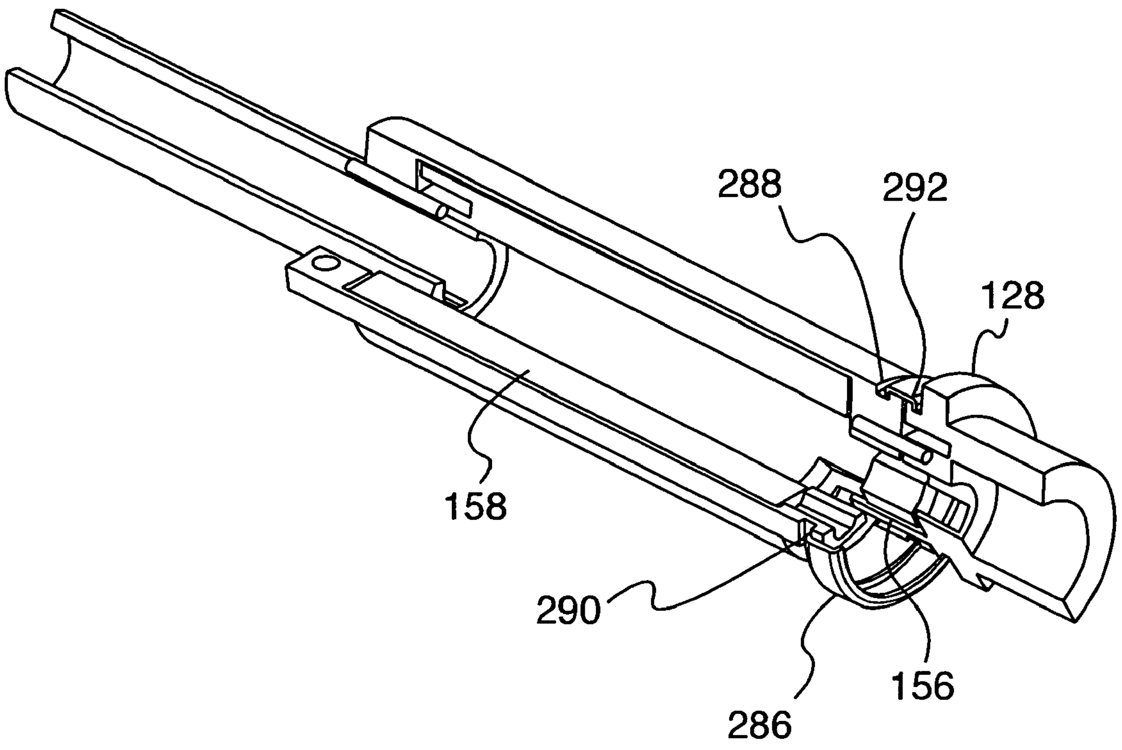
FIG. 8 is a sectioned perspective view showing detail of the upper half of the turnbuckle, with alignment cage and associated drive pin of the present device.

Rotation of rear rod 80 is prevented by attaching the rear terminal of rear rod 80 to the cap 54 at the end of transmission housing 52 via fixation nut 88. Rotation of the front rod 78 is prevented by attaching the rear terminal of rod 78 to the front terminal of rod 80 via key 90. As seen in FIG. 5, paddle 92 is attached to the front end of key 90, and rests in keyway slot 94 in front rod 78. As illustrated in FIG. 11, keyway slot 94 is comprised of two opposed channels 96, 98 which are cut into the inner bore 100 of front rod 78. As seen in FIG. 6, terminus 102 of keyway slot 94 is closed, preventing paddle 92 from disengaging from keyway slot 94. Pin 104 is attached to the rear end of key 90, and rests in keyway slot 106 in rear rod 80. Keyway slot 106 is comprised of a single channel 108 which is cut into the inner hollow 112 of rear rod 80. Terminus 114 of keyway slot 106 is closed, preventing pin 104 from disengaging from keyway slot 106.

Figure 9:
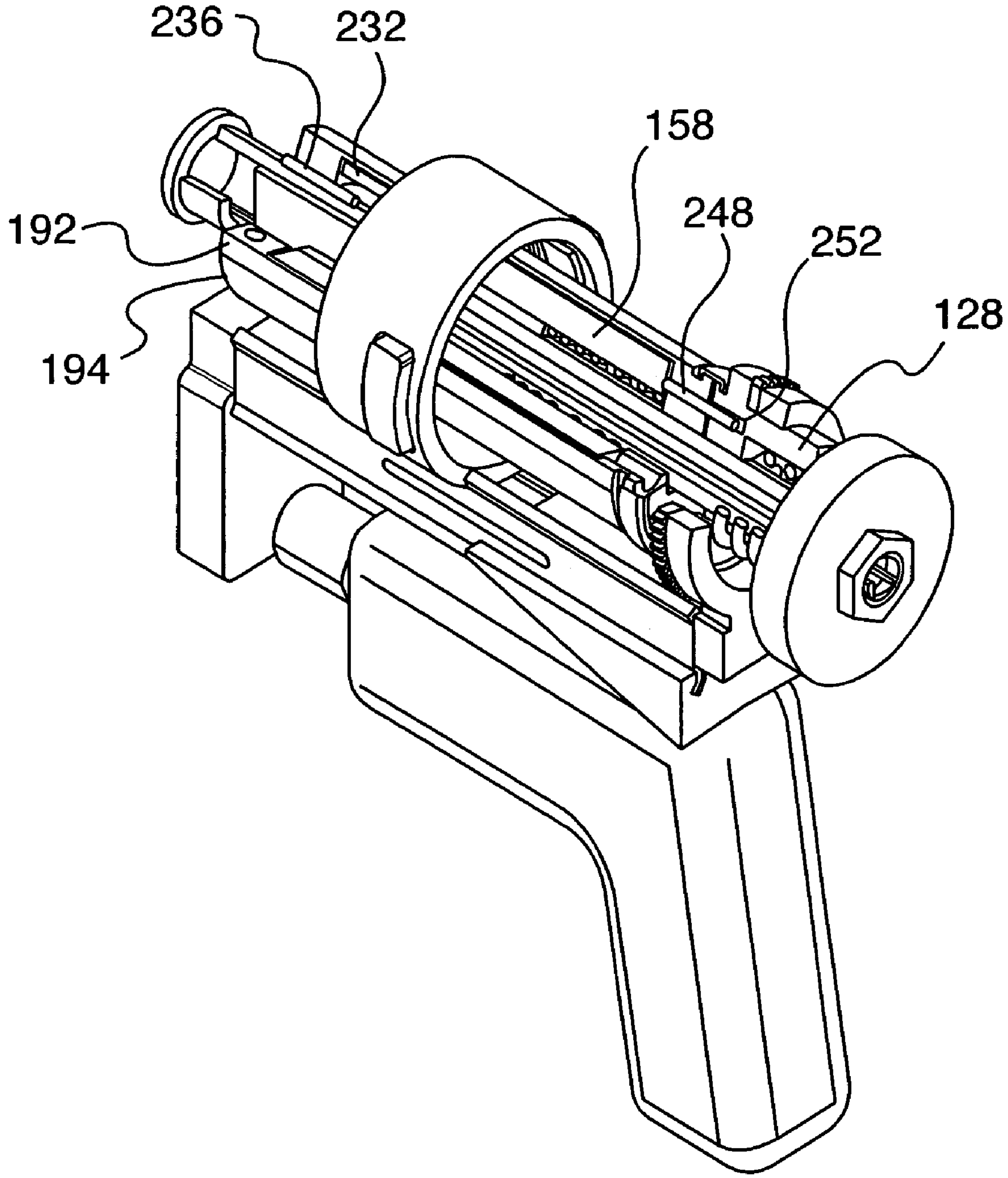
FIG. 9 is a sectioned perspective view showing detail of the present device, namely, the drive assembly with the turnbuckle halves in the engaged position and front and rear rods compacted, showing the positioning of cams and cam followers. Canister and transmission housing have been removed to reveal underlying detail.
Figure 10:
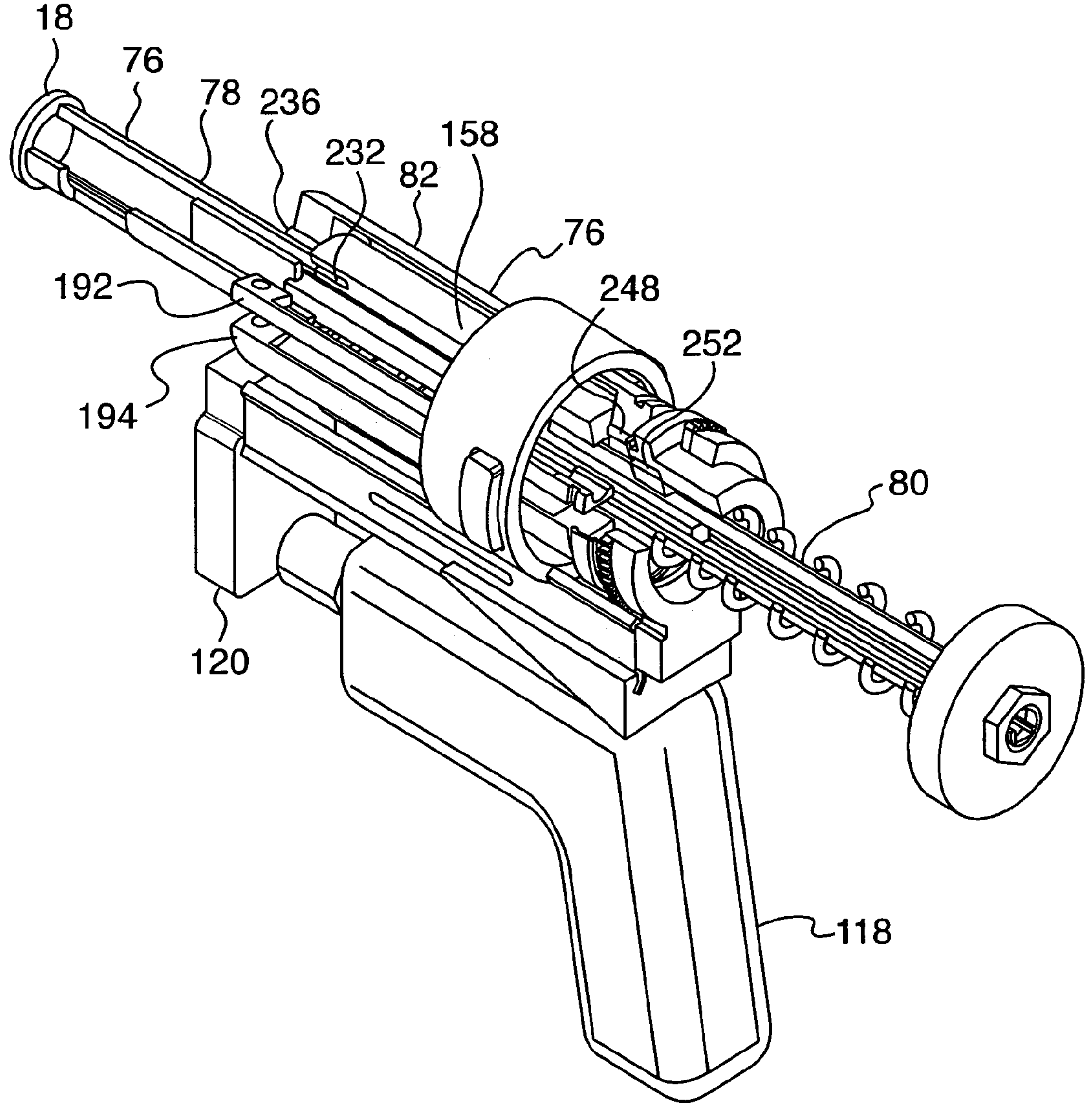
FIG. 10 is a sectioned perspective view showing detail of the present device, namely, the drive assembly with the turnbuckle halves in the disengaged position and front and rear rods fully expanded, showing the positioning of cams and cam followers. Canister and transmission housing have been removed to reveal underlying detail.

Front rod 78 is bored out so that the diameter of bore 100 is greater than the outer diameter of rear rod 80. Rear rod 80 is hollowed out so that the hollow 112 is dimensioned so that key 90 fits inside of hollow 112. Key 90, with paddle 92 at its front end and pin 104 at its rear end, is of a fixed length, so that the fixed length defines the maximum and minimum length of telescoping plunger assembly 76. The shortest length that telescoping plunger assembly 76 can have is defined as being when turnbuckle 82 is rotated in one direction (reverse direction) such that the front end of paddle 92 is pressed up against the front end of bore 100 and the rear end of pin 104 is pressed up against the rear end of hollow 112. Full retraction of telescoping plunger assembly 76 is seen in FIG. 9. The maximum length that telescoping plunger assembly 76 can have is defined as being when turnbuckle 82 is rotated in the opposite direction (forward direction) such that the rear end of paddle 92 is pressed up against the terminus 102 of keyway slot 94, which spans bore 100, and the front end of pin 104 is pressed up against terminus 114 of keyway slot 106, which spans hollow 112. Almost full extension of telescoping plunger assembly 76 is seen in FIG. 10.

Figure 13:
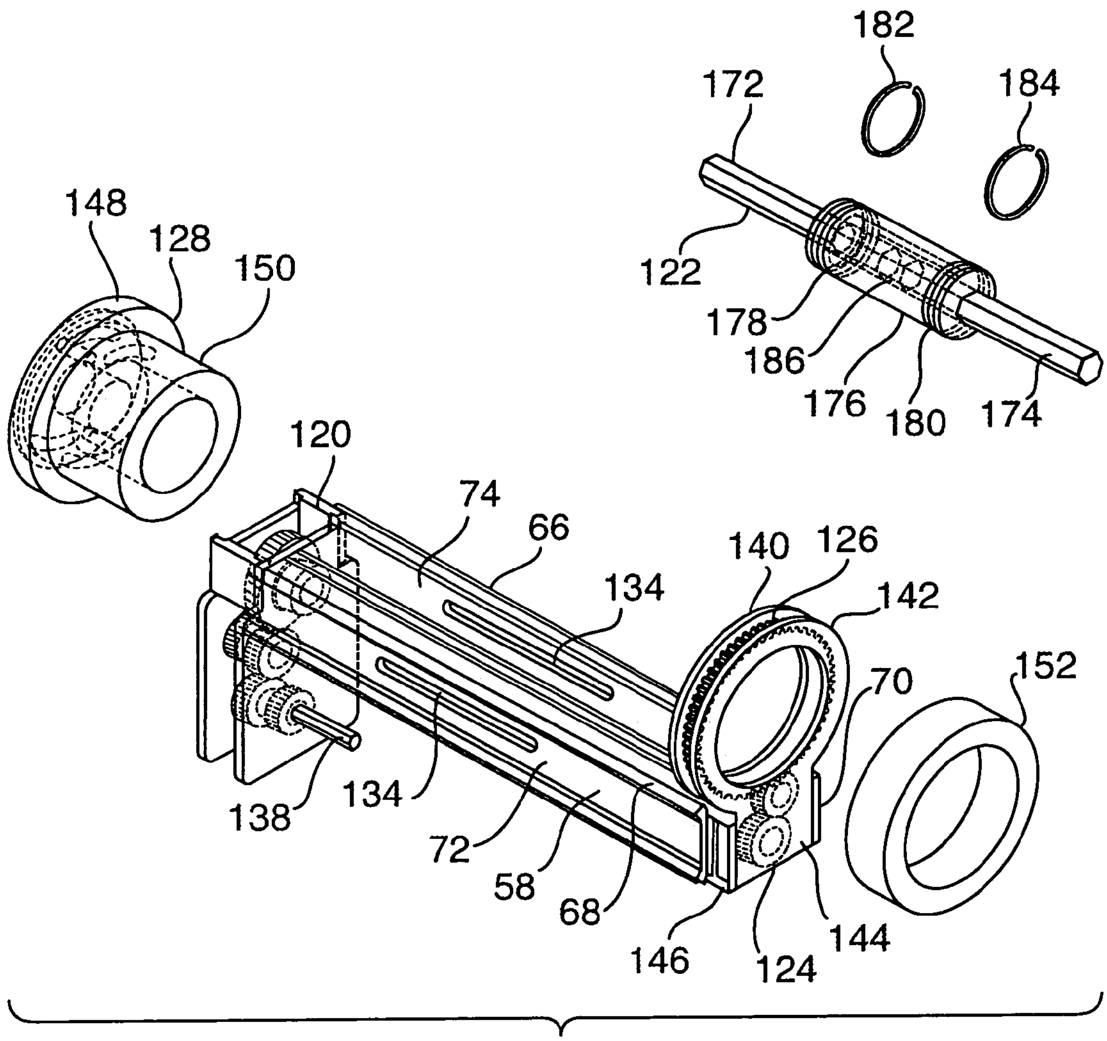
FIG. 13 is an exploded perspective view, partially in phantom, showing primary spur gear reduction unit, secondary gear reduction unit, driveshaft, drive hub and final gear of the present device.

Turnbuckle 82 is driven by drive train assembly means 116 which consists of a motor which is connected to a drive assembly 74. Drive assembly 74 consists of the parts of the device for dispensing substance from a cartridge 1 which transfer the force provided by a motor to telescoping plunger assembly 76 in a manner that will allow telescoping plunger assembly 76 to extend and compact, that is drive linkage 77 and the parts that prevent at least a portion of the telescoping plunger assembly from rotating relative to gun 1. In the embodiment of the invention illustrated in FIG. 1, the motor is a reversible drill 118 (an external power source) which is connected through a drive linkage 77, the details of which can be seen in FIG. 13, consisting of a primary spur gear reduction unit 120, a drive shaft 122, a secondary gear reduction unit 124, an output gear 126, and a drive hub 128, which is connected to drive pins 154 and 156 and alignment cage 158, which rotate turnbuckle 82. In the embodiment shown in FIG. 1, the motor is something which is adapted from a tool (i.e. drill 118) that most home handipersons or trades persons have available to them, making gun 1 more affordable and easily adaptable. Similarly, the device for dispensing substance from a cartridge 1 may be made to be adaptable to other external power sources. Ideally other external power sources would be pre-existing tools which are able to provide rotational force such as reversible motorised screwdrivers or grinders. Gun 1 may also be fitted with its own internal motor. An internal AC motor, connectable to household current or a DC motor connected to a battery pack or household current through a transformer are well known, and either is adaptable to power gun 1 through a suitable drive train.

The embodiment of the invention utilizing a reversible drill 118 as a motor will now be described in greater detail, with the understanding that other suitable motors are equally adaptable to the present invention. Gun 1 is detachably mounted on drill 118 via adapter block 130. This mounting can be achieved in a variety of ways that are well known such as a screw clamp, but the simplest and probably the best method is a simple strap 132 which passes through slots 134 in transmission frame members 70, 72 and secures around the body of drill 118 with a detachable closure such as a VELCRO™ hook and loop closure. The chuck 136 of drill 118 engages shaft 138, which drives a series of gears which make up primary spur gear reduction unit 120. Primary spur gear reduction unit 120 drives secondary gear reduction unit 124 through drive shaft 122. Secondary gear reduction unit 124 terminates with final gear 126. Final gear 126 is held between two plates 140 and 142, which are fixed at their lower ends to transmission frame members 70, 72 at points 144 and 146, respectively. Drive hub 128 is made of hub flange 148 and hub collar 150. Hub flange 148 rests in front of plates 140 and 142, and hub collar 150 passes through plates 140 and 142, allowing hub collar 150 to engage with the inner surface of output gear 126, which allows output gear 126 to rotate drive hub 128. Support ring 152 is affixed to the back end of hub collar 150, holding drive hub 128 in place on either side of plates 140 and 142. Drive pins 154 and 156 protrude out the front of drive hub 128 and are connected to an alignment cage 158 which sits within turnbuckle 82. Rotation of the drive hub 128 therefore indirectly drives rotation of turnbuckle 82, allowing for the extending and compacting of telescoping plunger assembly 76. The method by which the drive hub 128, alignment cage 158 and turnbuckle interact in the preferred embodiment to drive telescoping plunger assembly 76 will be described in detail once additional components of telescoping plunger assembly 76 and drive train means 116 are introduced.

Drive shaft 122 ideally is split into a forward driveshaft 172 and a rearward driveshaft 174 connected by clutch 176. Clutch 176 is split into at least two portions along its longitudinal axis. Annular grooves 178 and 180 at its forward and rearward end receive spring clips 182 and 184 which hold clutch 176 together. Forward driveshaft 172 and rearward driveshaft 174 have a non-circular cross-sectional profile and rest in recess 186 in clutch 176. In the embodiment illustrated in FIG. 13, the cross-sectional profiles of the forward and rearward driveshafts 172 and 174 and the recess 186 are hexagonal, but any mating non-circular cross-sectional profiles will do. When telescoping plunger assembly 76 is either at its fully extended or fully compacted position, front rod 78 and rear rod 80 will stop moving, which will, in turn, cause turnbuckle 82, alignment cage 158, drive pins 154 and 156, drive hub 128, output gear 126, and secondary gear reduction unit 124 to stop rotating, stopping rearward driveshaft 174. As drill 118 will continue to drive primary spur gear reduction unit 120, forward driveshaft 172 will continue to rotate while rearward driveshaft 174 will be stopped. Clutch 176 will stop rotating, to some extent, relative to forward driveshaft 172, and clutch 176 will continue to rotate, to some extent, relative to rearward driveshaft 174. When forward driveshaft 172, clutch 176, and rearward driveshaft 174 rotate at different rates, the portions of clutch 176 separate. As spring clips 182 and 184 will oppose the separation of clutch 176, a thunking noise will be made when forward and rearward driveshafts 172 and 174 move relative to recess 186, thereby alerting the operator that telescoping plunger assembly 76 has reached either end of its travel.

In a preferred embodiment of the present gun 1, it is desirable to be able to unload an empty cartridge 10 (that is, when telescoping plunger assembly 76 is fully extended) and reload a full cartridge 10 (that is, when telescoping plunger assembly 76 is fully compacted) without manually having to rewind telescoping plunger assembly 76 by reversing the direction of rotation of turnbuckle 82. FIGS. 7 to 9, 12, 16, and 17 illustrate a splitting fast rewind means comprising turnbuckle mechanism 190 whereby turnbuckle 82 is able to split into two halves, 192 and 194. When turnbuckle halves 192 and 194 separate (disengage), plunger assembly 76 consequently becomes fully extended as plunger biassing spring means generally designated by reference numeral 196 engage, whereby plunger biassing springs 198 and 200 are released and expand. The rearward end of plunger biassing spring 198 is connected to cap 54 and the forward end of plunger biassing spring 198 is connected to an inner recess 202 of drive hub 128. The rearward end of plunger biassing spring 200 is connected to inner surfaces 204 and 206 of turnbuckle halves 192 and 194, respectively, and the forward end of plunger biassing spring 200 is connected to the rearmost end of front rod 78. Turnbuckle halves 192 and 194 can open and close on the rearward end of plunger biassing spring 200 as the rearward end of plunger biassing spring 200 is squared. The rearward end of biassing spring 200 is contained by alignment cage 158 and the squared end slides on the inner surfaces 204 and 206 of the turnbuckle halves 192 and 194. When turnbuckle halves 192 and 194 separate, inner surfaces 204 and 206 maintain contact with the rearward end of plunger biassing spring 200. The rearward end of plunger biassing spring 200 is always centred, relative to turnbuckle halves 192 and 194, as the alignment cage 158 is pinned to drive hub 128 via pins 154 and 156. When a cartridge 10 is placed into canister 12, plunger head 18 rests up against base seal 16 of cartridge 10 due to the force exerted by plunger biassing springs 198 and 200 in keeping telescoping plunger assembly 76 extended. As cartridge 10 is placed into canister 12 and finally held in place with cap 22, telescoping plunger assembly 76 is compacted, but plunger biassing springs 198 and 200 continue to exert force along the length of gun 1, keeping plunger head 18 flush against the base seal 16 of cartridge 10. Plunger biassing springs 198 and 200 will keep telescoping plunger assembly 76 maximally extended when a cartridge 10 is placed in canister 12 of gun 1, no matter whether cartridge 10 is full or only partially full. As long as plunger biassing springs 198 and 200 have similar outward longitudinal tension strength, the two plunger biassing springs will be equally extended about drive hub 128 when turnbuckle halves 192 and 194 are disengaged. Once turnbuckle halves 192 and 194 are engaged, turnbuckle 82 is free to be rotated to drive telescoping plunger assembly 76 as previously described.

The mechanism by which turnbuckle halves 192 and 194 are engaged and disengaged is illustrated in FIGS. 7 to 9, 10 and 12.

Turnbuckle half 192 is composed of a semi-cylindrical shell 208 having a forward plug 210 having an inward semi-cylindrical face 212 and a rearward plug 214 having a semi-cylindrical face 216. Turnbuckle half 194 is composed of a semi-cylindrical shell 218 having a forward plug 220 having an inward semi-cylindrical face 222 and a rearward plug 224 having a semi-cylindrical face 226. Semi-cylindrical faces 216, 212, 222 and 226 are all threaded and dimensioned to mate with the threading on the exterior surfaces of front rod 78 and rear rod 80, as the case may be. Alignment cage 158 rests within the cylindrical shells 208 and 218 of turnbuckle halves 192 and 194, and rearward of forward plugs 210 and 220 and forward of rearward plugs 214 and 224, thereby holding turnbuckle halves 192 and 194 in place along the length of gun 1. The inner bore 228 of alignment cage 158 is slightly larger than the diameter of front rod 78 and of plunger biassing spring 200, such that front rod 78 and plunger biassing spring 200 can rest within the inner bore 228 of alignment cage 158. The front face 230 of alignment cage 158 incorporates diametrically opposed cam slots 232 and 234 which accept cam followers 236 and 238 respectively. Cam follower 236 is imbedded in the middle of front plug 210 in turnbuckle half 192. Cam follower 238 is imbedded in the middle of front plug 220 in turnbuckle half 194. The rearmost end of alignment cage 158 accepts drive pins 154 and 156 from drive hub 128. Drive pin 156 protrudes through clearance slot 240 in rearward plug 224 of turnbuckle half 194 and connects to drive hub 128 at point 242. Drive pin 154 protrudes through clearance slot 244 in rearward plug 214 of turnbuckle half 192 and connects to drive hub 128 at point 246. Rearward plugs 214 and 224 of turnbuckle halves 192 and 194 support cam follower pins 248 and 250 respectively which engage cam slots 252 and 254 of drive hub 128. Rotation of drive hub 128 in the forward direction causes an equal, corresponding, rotation of alignment cage 158, which is connected to drive hub 128 through drive pins 154 and 156.

Engagement of turnbuckle halves 192 and 194 is accomplished through applying a braking force to turnbuckle 82 while drive hub 128 is rotating in the forward direction. A preferred embodiment of a braking means mechanism which will achieve this result is best illustrated in FIG. 11. Brake actuator mechanism 256 is contained within ring 46. Brake actuator mechanism 256 consists of engagement buttons 258 and 260, brake shoes 262 and 264, friction surfaces 266 and 268, and biassing springs 270 and 272. One assembly of brake engagement button 258, brake shoe 262, friction surface 266 and biassing spring 270 is set up on one side of ring 46, and an other similar assembly of brake engagement button 260, brake shoe 264, friction surface 268 and biassing spring 272 is set up on the opposite side of ring 46. When brake engagement buttons 258 and 260 are depressed, biassing springs 270 and 272 (leaf springs in the preferred embodiment illustrated in FIG. 11) engage brake shoes 262 and 264 and friction surfaces 266 and 268 are pressed up against the outer surface of turnbuckle 82. Not much braking force is required to retard turnbuckle 82, as drive pins 154 and 156 do not come into direct contact with turnbuckle halves 192 and 194, but rather pass through clearance slots 244 and 240, respectively. However the continued rotation of alignment cage 158 causes drive pins 154 and 156 to move from one side of clearance slots 244 and 240 to the other. While this rotation is occurring cam follower pins 250, 248, 236 and 238 move from one side to the other side of cam slots 252, 254, 232 and 234 respectively, causing turnbuckle halves 192 and 194 to close down (engage). Once turnbuckle halves 192 and 194 are engaged, brake actuator mechanism 256 is released, allowing turnbuckle 82 to rotate in the forward direction.

When cam follower pins 250, 248, 236, and 238 interact with cam slots 252, 254, 232, and 234, respectively, causing turnbuckle halves 192 and 194 to close down, threads on semi-cylindrical faces 212 and 222 mate with the corresponding threads on the external face of front rod 78 and threads on semi-cylindrical faces 216 and 226 mate with the corresponding threads on the external face of rear rod 80, thereby engaging turnbuckle 82 with front rod 78 and rear rod 80. Once turnbuckle 82 is engaged, rotation of drive hub 128 in either direction (i.e. forward or reverse) will not cause turnbuckle halves 192 and 194 to disengage because the initial rotational torque is not strong enough to disengage the turnbuckle halves 192 and 194 when the motor is turned on to rotate the drive hub 128 in the either the forward or the reverse direction.

Separation of turnbuckle halves 192 and 194 is accomplished through applying a braking force to turnbuckle 82 while drive hub 128 is rotating in the reverse direction. A preferred embodiment of a braking means mechanism which will achieve this result is best illustrated in FIG. 11. Brake actuator mechanism 256 is contained within ring 46. Brake actuator mechanism 256 consists of engagement buttons 258 and 260, brake shoes 262 and 264, friction surfaces 266 and 268, and biassing springs 270 and 272. One assembly of brake engagement button 258, brake shoe 262, friction surface 266 and biassing spring 270 is set up on one side of ring 46, and an other similar assembly of brake engagement button 260, brake shoe 264, friction surface 268 and biassing spring 272 is set up on the opposite side of ring 46. When brake engagement buttons 258 and 260 are depressed, biassing springs 270 and 272 (leaf springs in the preferred embodiment illustrated in FIG. 11) engage brake shoes 262 and 264 and friction surfaces 266 and 268 are pressed up against the outer surface of turnbuckle 82. Not much braking force is required to retard turnbuckle 82, as drive pins 154 and 156 do not come into direct contact with turnbuckle halves 192 and 194, but rather pass through clearance slots 244 and 240, respectively. However the continued rotation of alignment cage 158 causes drive pins 154 and 156 to move from one side of clearance slots 244 and 240 to the other. While this rotation is occurring cam followers 250, 248, 236 and 238 move from one side to the other side of cam slots 252, 254, 232 and 234 respectively, causing turnbuckle halves 192 and 194 to disengage.

Front plug 210 in turnbuckle half 192 contains two bored wells 274 and 276. Front plug 220 in turnbuckle half 194 incorporates two bored wells 278 and 280. Well 274 in turnbuckle half 192 lines up with well 278 in turnbuckle half 194, and the two collinear wells 274 and 278 contain separation spring 282. Well 276 in turnbuckle half 192 lines up with well 280 in turnbuckle half 194, and the two collinear wells 276 and 280 contain separation spring 284. Separation springs 282 and 284 serve to prevent relative rotation of turnbuckle halves 192 and 194 upon the disengagement of turnbuckle 82.

Turnbuckle 82 is joined to drive hub 128 by a circumferential clip 286 which fits into grooves 288 and 290 on turnbuckle halves 192 and 194, respectively, and groove 292 on drive hub 128. Circumferential clip 286 is a C-clip, which will allow for the engagement and disengagement of turnbuckle halves 192 and 194 while still holding drive hub 128 to turnbuckle 82. Without circumferential clip 286, disengaged turnbuckle halves 192 and 194 are only held to drive hub 128 indirectly through drive pins 154 and 156 which connect alignment cage 158 to drive hub 128.

When one is expelling substance from a cartridge 10 mounted in the gun, it is desirable to have fine control over the termination of substance delivery. Ordinarily, when one is expelling substance and one stops telescoping plunger assembly 76 abruptly, the contents of cartridge 10, being viscous, will continue to ooze out of delivery cone 14. One can stop the flow of substance abruptly by withdrawing telescoping plunger assembly 76. This abrupt withdrawal can be accomplished by reversing the direction of rotation of turnbuckle 82 through reversing the direction of rotation of the motor driving turnbuckle 82, but this process can be cumbersome if done manually. If the motor is part of gun 1, then a backfeed circuit can be constructed that will automatically turn on the motor in a reverse direction for a brief second or two when the motor is first turned off.

Figure 14:
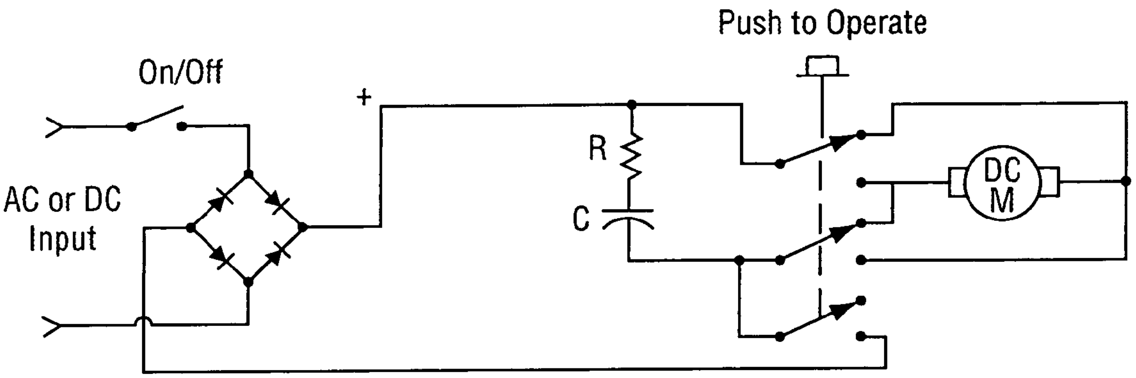
FIG. 14 is a circuit diagram showing a passive backfeed circuit to reverse the direction of rotation of the drive hub when an internal motor for driving the device is turned off.
Figure 15:
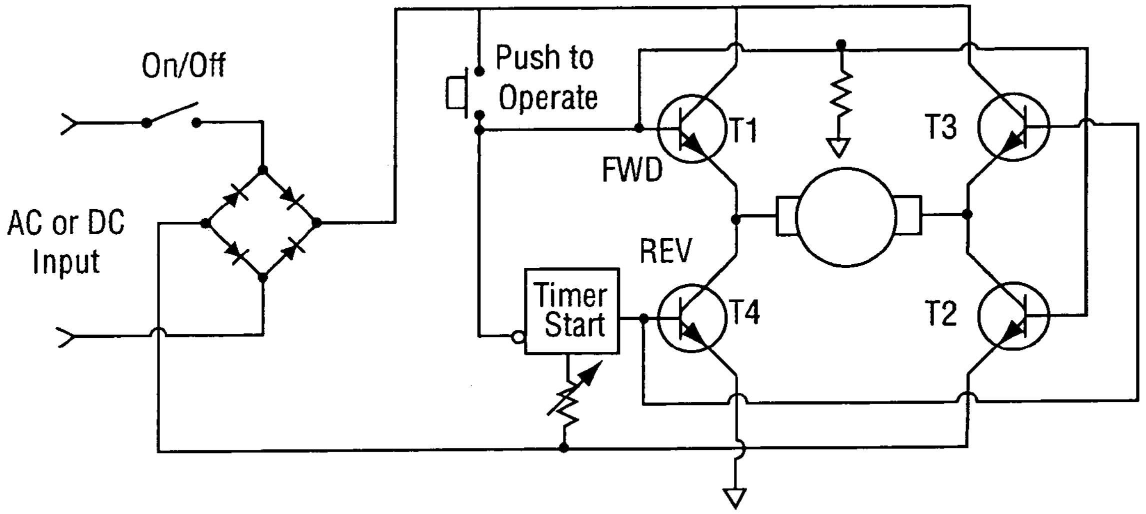
FIG. 15 is a circuit diagram showing an active backfeed circuit to reverse the direction of rotation of the drive hub when an internal motor for driving the device is turned off.

An example of a passive and an active backfeed circuit are illustrated in FIGS. 14 and 15, respectively. The passive circuit comprises an AC or a DC power supply; a power switch; a bridge rectifier to convert an AC input to DC; a resistor-capacitor timer circuit; a three pole two-position momentary contact switch to supply power to a motor; and a DC motor. The power switch connects/isolates power between the source input and the control circuit. Closure of the switch charges a capacitor to the output voltage of the bridge. The two-position momentary contact switch isolates the motor. Activation of the two-position momentary contact switch provides power continuity for the motor which will run until the two-position momentary contact switch is deactivated. Deactivation of the two-position momentary contact switch isolates power supply and allows a timed discharge of the capacitor through the motor, reversing the motor's direction of rotation for a timed period which is dependant of the relative values of the resistor and the capacitor. The active circuit comprises an AC or a DC power supply; a power switch; a bridge rectifier to convert an AC input to DC; a single pole, single throw momentary contact switch to supply power to a power transistor bridge; a transistor bridge to supply power to a motor for forward or reverse rotation, and a variable timer unit consisting of a timer and a resistor to provide timed reverse of motor rotation. The power switch connects/isolates power between the source input and the control circuit. Closure of the single pole, single throw momentary contact switch activates transistors T1 and T2 in the transistor bridge providing continuity to the motor and timer and the motor will run until the single pole, single throw momentary contact switch is deactivated. Deactivation of the single pole, single throw momentary contact switch will result in the timer unit providing a timed signal which activates transistors T3 and T4 powering the motor in a reverse direction for a programmable period of time.

If gun 1 is being powered by an external power source such as drill 118 or an electric screwdriver, a simple reversal of direction of the drill or screwdriver can be utilized to achieve the same effect as an automatic reverse function when the external power source is turned off. Often it is cumbersome to find the switch and manually reverse the direction of rotation of a drill or electric screwdriver when an operator is concentrating on the application of caulking (or other similar substance) from the gun. In such an instance it may be easier for the operator to merely turn off the power source and squeeze together handles 37, 39 on C-clamp 41, which is positioned over the rear portion 38 of canister 12. This squeezing will disengage canister 12 from ring 46 (as previously described) and allows the operator to pull cartridge 10 and canister 12 away from the gun, which is abruptly breaks contact between plunger head 18 of telescoping plunger assembly 76 and base seal 16 of cartridge 10, thereby stopping the flow of substance from cartridge 10 through delivery cone 14.

Gun 1 can additionally be fitted with a means for guiding the delivery of substance from the delivery cone (or a bead application guide) 14 along the surface of which the substance is being applied. Guide mount 60 is attached towards the front end of canister 12, as is seen in FIG. 1. Guide mount 60 has a forward-facing horizontal channel 320 and a vertical channel 322. Horizontal channel 320 and vertical channel 322 have cross-sectional profiles which are key hole shaped, and are adapted to grip various guides through a snap fit.

Figure 20:
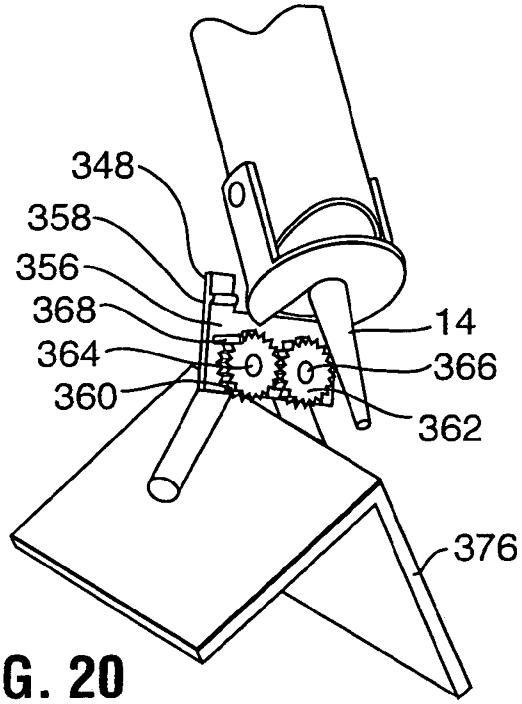
FIG. 20 is a perspective view of an adjustable guide fitted to the guide mount.

Three bead application guides are shown in FIGS. 18, 19, 20 and 21. Joist guide 324 and seam guide 326 are shown in FIGS. 18*s* and 10 respectively and adjustable guide 348 is shown in FIGS. 20 and 21. Joist guide 324 has a cylindrically shaped top edge 328 which can be snap fitted into either horizontal channel 320 or vertical channel 322 of guide mount 60. Guide arms 330 and 332 extend from either side of the body 336 of joist guide 324. Joist guide 324 is used by positioning guide arms 330 and 332 on either side of a joist 400 thereby aligning delivery cone 14 towards the middle of the joist. Joist 400 is not part of the present invention, but is rather an external surface to which substance is being applied. Substance can therefore be expelled from the gun while it moves along the length of the joist and keeping arms 330 and 332 on either side of the joist. A substance bead running the length of the joist can therefore be produced. A variety of different sized joist guides 324 can be produced having different widths of body 336, which would be adaptable to various widths of joist.

Seam guide 326 comprises top edge 338 with a key hole shaped cross sectional profile which can be snap fitted into either horizontal channel 320 or vertical channel 322 of guide mount 60. Arms 340 and 342 extend down equally from either side of top edge 338 and join at axle 344, about which wheel 346 is free to rotate. When seam guide 326 is mounted in either horizontal channel 320 or vertical channel 322, wheel 346 is aligned with the centre of delivery cone 14. Wheel 346 can be rolled over a seam, 401, thereby positioning delivery cone 14 over the seam. Seam 401 is not part of the present invention, but is rather an external surface to which substance is being applied. If substance is being expelled from a cartridge 10 contained in the gun, it will be deposited along the length of the seam.

Adjustable guide 348 has a top edge 350 with a key hole shaped cross-sectional profile which can be snap fitted into either horizontal channel 320 or vertical channel. 322 of guide mount 60. Adjustable guide arms 352 and 354 extend downwardly from the back face 403 of the body 358 of adjustable guide 348. Adjustable arms 352 and 354 are connected to gears 360 and 362 which are mounted on the front face 356 of the body 358 of adjustable guide 348 via pivots 364 and 366 respectively. Gears 360 and 362 intermesh so that when one is rotated about its pivot, the other is rotated by an equal amount in the opposite direction; consequently when the position of either adjustable guide arm 352 or 354 is adjusted in the plane of the rear face 403 of the body 358 of the adjustable guide, the other adjustable guide arm will be automatically positioned along that plane at an equal angle from an imaginary perpendicular plane bisecting adjustable guide arms 352 and 354. The position of adjustable guide arms 352 and 354 can be locked by inserting pin 368 into hole 370 in the rear face 403 of the body 358 of adjustable guide 348. When inserted in hole 370, pin 368 abuts at least one of the teeth of either gear 360 or 362, which prevents the rotation of both gears 360 and 362. Adjustable guide arms 352 and 354 terminate in feet 372 and 374, which are able to rest on a surface to which substance is being applied. FIG. 20 illustrates feet 372 and 374 resting on surface 376 (surface 376 is not part of gun 1, but is rather an external surface to which substance is being applied), thereby steadily positioning delivery cone 14 above surface 376.

As was described earlier, canister 12 can be rotated about ring 46, thereby positioning any guide mounted in guide mount 60 at a convenient position relative to the positioning of the operator who is holding the gun.

Figure 22:
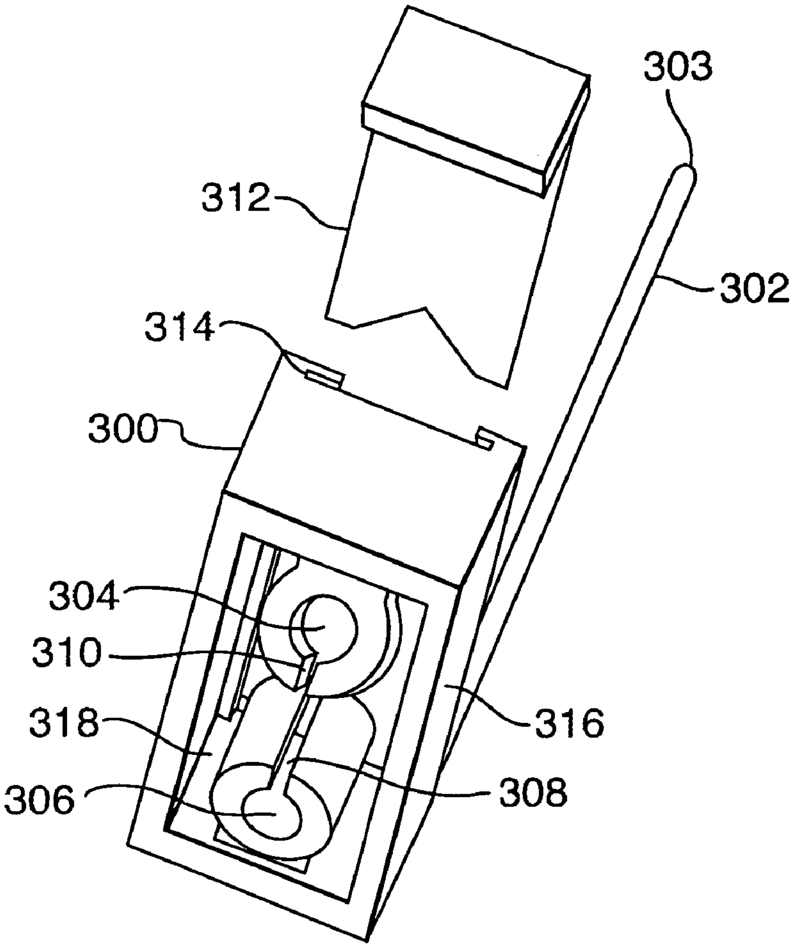
FIG. 22 is a perspective view showing the detail of a tip cutter and a puncture rod for the present device, when not fitted to the present device.
Figure 23:
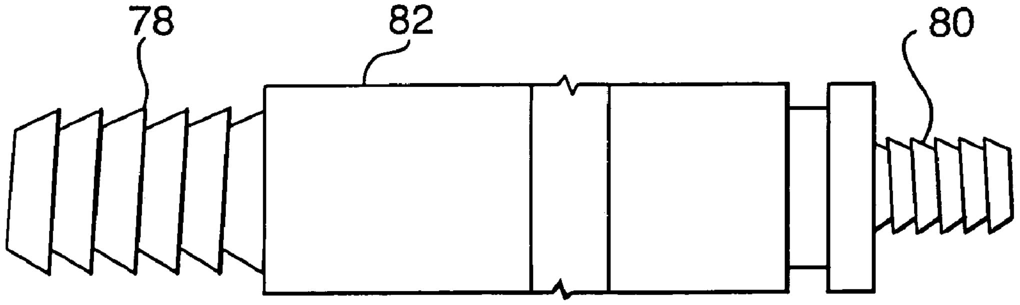
FIG. 23 is a side elevational view showing detail of the threads of the front and rear rods of the present device, with the majority of the length of the turnbuckle being cut away.

Gun 1 may also be outfitted with a tip cutter 300 for cutting delivery cone 14 of cartridge 10 and a puncture rod 302 for piercing the cartridge seal that is found at the forward end of most commercially manufactured cartridges just posterior of the delivery cone. Tip cutter 300 and puncture rod 302 are mounted on the front surface of primary gear reduction unit 120 or some other convenient location on the gun. Tip cutter 300 and puncture rod 302 are illustrated in FIG. 22, which shows them when they are not mounted on gun 1. Tip cutter 300 has two cylindrical receiving slots 304 and 306, which are made of a compliant material, with longitudinal slits 308 and 310 along their respective lengths. Consequently, receiving slots 304 and 306 are able to receive a delivery cone 14 that is inserted into them and hold the cone tightly. Delivery cone 14 can be inserted more or less deeply into either receiving slot 304 or 306, depending on how far from the tip one wants to cut the delivery cone 14. Guillotine blade 312 is held and slides within chopping slot 314 in tip cutter body 316 at such an angle to conveniently open the end of delivery cone 14 when delivery cone 14 is placed in receiving slot 304 or 306 and guillotine blade 312 is depressed within chopping slot 314. Receiving slots 304 and 306 may be at any convenient angle but in FIG. 22, receiving slot 304 is angled at approximately forty-five degrees to guillotine blade 312 and receiving slot 306 is angled at approximately ninety degrees to guillotine blade 312. Practically, any angle between ninety and forty-five degrees is optimal. An angle slightly less than forty-five degrees is still convenient, but as the plane of chopping slot 314 gets closer to that of receiving slot 304, the cut produced at the tip of delivery cone 14 will become less well suited to deliver a smooth bead of substance from cartridge 10. Tip cutter 300 may also be comprised of a hole in the face 318 of the tip cutter rather than a receiving slot.

Puncture rod 302 may be used to puncture the front seal in cartridge 10 found just posterior to the tip of delivery cone 14 after the tip of delivery cone 14 has been cut by merely inserting the end 303 of puncture rod 302 into the cut tip delivery cone 14.

The present device can be made primarily of plastic or nylon material, or a combination of the two, except for the motor, electrical contacts and some of the drive parts. Plastic/nylon components are more durable than the metal components that have been used in substance delivery guns in the past as plastic/nylon components are more resistant to dents and to corrosion. Plastic/nylon components can additionally be more lightweight and less costly than similarly sized metal components.

Figure 24A:
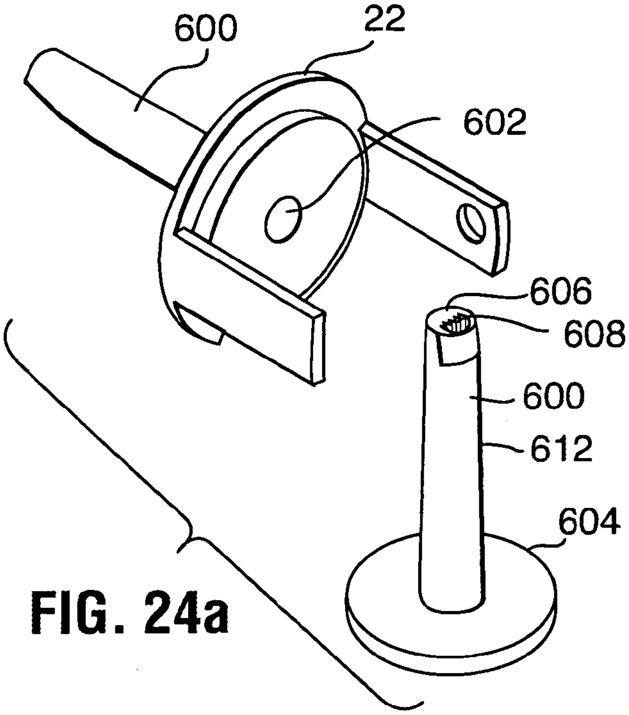
FIGS. 24*a, b* and *c* are perspective views of a variety of detachable nipples for use with the present device.
Figure 24B:
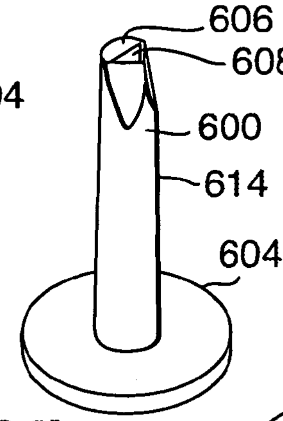
Figure 24C:
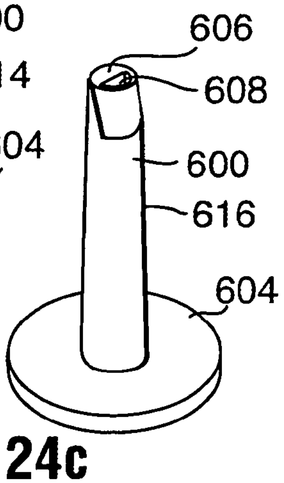

Various detachable nipples may be used with the present device for dispensing substance from gun 1 for the creation of specific bead shapes from the flow of substance dispensed from the cartridge 10 through the delivery cone 14. Several such nipples are illustrated in FIGS. 24*a, b* and *c*. Each nipple 600 is hollowed out and has a base end 602 dimensioned to fit over the delivery cone 14 at the front of cartridge 10 when cartridge 10 is placed in cannister 12. Each nipple 600 additionally has a collar 604 at its base end 602 which abuts the front end of cartridge 10 when nipple 600 is placed over delivery cone 14. Nipple 600 is held in place over delivery cone 14 when retaining cap 22 is swung into position over nipple 600 covering delivery cone 14 and collar 604 which abuts the front end of cartridge 10, in the same manner that was described earlier for swinging retaining cap 22 into position over delivery cone 14 when nipple 600 was not being used.

Figure 25A:
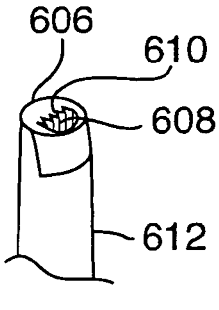
FIGS. 25*a, b* and *c* are expanded views of the tips of the nipples shown in FIGS. 24*a, b* and *c.*
Figure 25B:
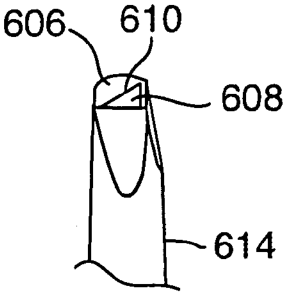
Figure 25C:
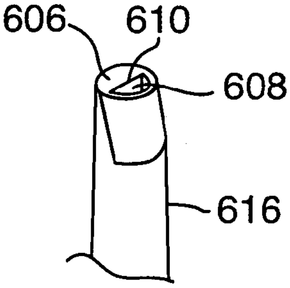

With reference to FIGS. 25*a, b* and *c,* the tip 606 of each nipple has a shaping surface at its opening. As substance is being expelled through the delivery cone 14 of a cartridge 10 in the gun, it is passed through the inner surface of the nipple and is directed towards the orifice 608 at the tip of the nipple, through which substance is expelled and where the substance meets shaping surface 610. As the substance being expelled from the cartridge is viscous, it will take the shape of the shaping surface at the orifice at the tip of the nipple. For example, nipple 612 has a shaping surface which will produce a bead with a ribbed top and a semi-cylindrical bottom surface, nipple 614 will produce a bead with a triangular cross-sectional profile, and nipple 616 will produce a semi-cylindrical bead. These examples are given as being illustrative of what shapes of beads can be created using the detachable nipples and are not intended to limit the scope of what is the invention being described. Differently configured shaping surfaces will create beads with different shapes and are intended to be captured in the detachable nipples being described herein.

Several variations of the invention presently described will be understood by one skilled in the art to come within the scope of the present invention. The only limitations on the scope of the present invention intended by the inventor are the following, attached claims.

We claim:

1. A device for dispensing substance from a cartridge comprising:

a retaining means for retaining a substance containing cartridge;

a telescoping plunger assembly, said telescoping plunger assembly being made up of at least a frontmost member, a rearmost member and at least one intervening member, the at least one intervening member being a turnbuckle;

a base to which at least a portion of said telescopic plunger assembly is fixed;

a drive train means for rotating said turnbuckle of said telescoping plunger assembly; and a fast rewind means comprising a turnbuckle splitting means whereby said turnbuckle longitudinally splits into two turnbuckle halves, and plunger biassing means whereby said telescoping plunger assembly may be manually compacted against the resistive force of a plurality of plunger biassing springs.

2. The device for dispensing substance from a cartridge of claim 1, wherein said retaining means is slidably connected to said base and rotation of said turnbuckle causes said foremost member to move forward and said rearmost member to move rearward, the movement of said rearmost member causing said retaining means to move rearwards.

3. The device for dispensing substance from a cartridge of claim 1 wherein the telescoping plunger assembly includes a plurality of threaded, at least partially hollowed out, members each of which can be withdrawn into or upon an adjacent member when one of said members is rotated.

4. The device for dispensing substance from a cartridge of claim 3 wherein the turnbuckle is rotated and the frontmost and the rearmost members do not rotate relative to each other and do not rotate relative to a transmission housing to which the rearmost member is fixed and wherein the retaining means for retaining a substance containing cartridge is fixed relative to the transmission housing.

5. The device for dispensing substance from a cartridge of claim 4 wherein a passive backfeed circuit operates to reverse the direction of rotation of the turnbuckle for a brief time when the drive train means stops rotating the turnbuckle in the forward direction by reversing the direction of the internal motor for a brief time when the motor is turned off after rotating the turnbuckle in the forward direction.

6. The device for dispensing substance from a cartridge of claim 4 wherein an active backfeed circuit operates to reverse the direction of rotation of the turnbuckle for a brief time when the drive train means stops rotating the turnbuckle in the forward direction by reversing the direction of the internal motor for a brief time when the motor is turned off after rotating the turnbuckle in the forward direction.

7. The device for dispensing substance from a cartridge of claim 3 wherein the drive train means for driving the telescoping plunger assembly is powered by a reversible external power source connected to a drive linkage which rotates the turnbuckle.

8. The device for dispensing substance from a cartridge of claim 3 wherein the drive train means for driving the telescoping plunger assembly is powered by an internal motor connected to a drive assembly which rotates the turnbuckle.

9. The device for dispensing substance from a cartridge of claim 1 wherein the turnbuckle splitting means is comprised of a plurality of cam slots and cam followers in an alignment cage and in a drive hub and a plurality of clearance slots in the two turnbuckle halves.

10. The device for dispensing substance from a cartridge of claim 9 additionally consisting of a braking means mechanism whereby the splitting of the turnbuckle is controlled by retarding the rotation of the turnbuckle.

11. The device for dispensing substance from a cartridge of claim 10 wherein the braking means mechanism is comprised of a brake actuator mechanism which presses at least one friction surface of at least one brake shoe against an outer surface of the turnbuckle.

12. The device for dispensing substance from a cartridge of claim 1 wherein said drive train means includes a forward drive shaft, a rearward drive shaft, and a clutch, whereby said clutch longitudinally splits into two portions that are held together with spring clips, and rotation of said forward drive shaft or said rearward drive shaft when said telescopic plunger assembly is fully expanded or retracted causes said two portions of said clutch to separate and said forward drive shaft or said rearward drive shaft to rotate within said clutch.

13. The device for dispensing substance from a cartridge of claim 12 wherein said forward drive shaft and said rearward drive shaft are hexagonal in cross-section.

14. The device for dispensing substance from a cartridge of claim 12 wherein rotation of a forward drive shaft or a rearward drive shaft within said clutch causes a clicking noise.

15. The device for dispensing substance from a cartridge of claim 1 wherein the device additionally comprises a guide mount which is adapted to receive a detachable, snap fitting joist guide.

16. The device for dispensing substance from a cartridge of claim 15 wherein the device additionally comprises a detachably mountable joist guide comprising a body and arms extending downwardly from either side of said body.

17. The device for dispensing substance from a cartridge of claim 16 wherein the device additionally comprises a detachably mountable seam guide comprising a body and arms extending downwardly from either side of said body.

18. The device for dispensing substance from a cartridge of claim 17 wherein the device additionally comprises a detachably mountable adjustable guide comprising a body, two downwardly extending guide arms, each of said arms being pivotally mounted on a gear on a front face of said body, each of said gears having a plurality of teeth which intermesh with the teeth on the other gear.

19. The device for dispensing substance from a cartridge of claim 1 wherein the device additionally comprises a guide mount which is adapted to receive a detachable, snap fitting seam guide.

20. The device for dispensing substance from a cartridge of claim 1 wherein the device additionally comprises a guide mount which is adapted to receive a detachable, snap fitting adjustable guide.

21. The device for dispensing substance from a cartridge of claim 1 wherein the device additionally comprises a tip cutter comprising a receiving slot, a chopping slot which intersects with said receiving slot at a fixed angle between forty-five and ninety degrees, and a guillotine blade slidably mounted in said receiving slot.

22. The device for dispensing substance from a cartridge of claim 1 wherein the device additionally comprises a puncture rod.

23. The device for dispensing substance from a cartridge of claim 1 wherein the device additionally comprises a plurality of nipples, each of which are detachably held in place by the retaining means, each nipple having a shaping surface adjacent to an orifice through which substance is expelled.

24. A device for dispensing substance from a cartridge comprising a retaining means for retaining a substance containing cartridge;

a telescoping plunger assembly including:

a foremost member;

a rearmost member;

a turnbuckle;

a base to which at least a portion of said telescoping plunger assembly is fixed, said retaining means being slidably connected to said base; and a drive train means for rotating said turnbuckle of said telescoping plunger assembly, wherein rotation of said turnbuckle causes said foremost member to move forward and said rearmost member to move rearward, the movement of said rearmost member causing said retaining means to move rearwards.

25. The device for dispensing substance from a cartridge of claim 24 wherein the telescoping plunger assembly includes a plurality of threaded, at least partially hollowed out, members each of which can be withdrawn into or upon an adjacent member when one of said members is rotated.

26. The device for dispensing substance from a cartridge of claim 25 wherein the turnbuckle is rotated and the frontmost and the rearmost members do not rotate relative to each other and do not rotate relative to a transmission housing to which the rearmost member is fixed and wherein the retaining means for retaining a substance containing cartridge is fixed relative to the transmission housing.

27. The device for dispensing substance from a cartridge of claim 26 additionally consisting of a fast rewind means comprising a turnbuckle splitting means whereby the turnbuckle longitudinally splits into two turnbuckle halves, and plunger biassing means whereby the telescoping plunger assembly may be manually compacted against the resistive force of a plurality of plunger biassing springs.

28. The device for dispensing substance from a cartridge of claim 27 wherein the turnbuckle splitting means is comprised of a plurality of cam slots and cam followers in an alignment cage and in a drive hub and a plurality of clearance slots in the two turnbuckle halves.

29. The device for dispensing substance from a cartridge of claim 28 additionally consisting of a braking means mechanism whereby the splitting of the turnbuckle is controlled by retarding the rotation of the turnbuckle.

30. The device for dispensing substance from a cartridge of claim 29 wherein said braking means mechanism is comprised of a brake actuator mechanism which presses at least one friction surface of at least one brake shoe against an outer surface of the turnbuckle.

31. The device for dispensing substance from a cartridge of claim 24 wherein said drive train means includes a forward drive shaft, a rearward drive shaft, and a clutch, whereby said clutch longitudinally splits into two portions that are held together with spring clips, and rotation of said forward drive shaft or said rearward drive shaft when said telescopic plunger assembly is fully expanded or retracted causes said two portions of said clutch to separate and said forward drive shaft or said rearward drive shaft to rotate within said clutch.

32. The device for dispensing substance from a cartridge of claim 31 wherein a passive backfeed circuit operates to reverse the direction of rotation of the turnbuckle for a brief time when the drive train means stops rotating the turnbuckle in the forward direction by reversing the direction of the internal motor for a brief time when the motor is turned off after rotating the turnbuckle in the forward direction.

33. The device for dispensing substance from a cartridge of claim 31 wherein an active backfeed circuit operates to reverse the direction of rotation of the turnbuckle for a brief time when the drive train means stops rotating the turnbuckle in the forward direction by reversing the direction of the internal motor for a brief time when the motor is turned off after rotating the turnbuckle in the forward direction.

34. The device for dispensing substance from a cartridge of claim 24 wherein the drive train means for driving the telescoping plunger assembly is powered by a reversible external power source connected to a drive linkage which rotates the turnbuckle.

35. The device for dispensing substance from a cartridge of claim 24 wherein the drive train means for driving the telescoping plunger assembly is powered by an internal motor connected to a drive assembly which rotates the turnbuckle.

* * * * *